United States Patent [19]

Dickinson et al.

[11] Patent Number: 4,495,566
[45] Date of Patent: Jan. 22, 1985

[54] METHOD AND MEANS USING DIGITAL DATA PROCESSING MEANS FOR LOCATING REPRESENTATIONS IN A STORED TEXTUAL DATA BASE

[75] Inventors: Robert V. Dickinson, Sandy Hook; Louis M. Galie, Westport, both of Conn.

[73] Assignee: System Development Corporation, Santa Monica, Calif.

[21] Appl. No.: 307,093

[22] Filed: Sep. 30, 1981

[51] Int. Cl.³ .............................................. G06F 7/30
[52] U.S. Cl. .................................................. 364/200
[58] Field of Search ............................... 364/900, 200

[56] References Cited

U.S. PATENT DOCUMENTS

| | | | |
|---|---|---|---|
| 3,713,107 | 1/1973 | Barsamian | 364/200 |
| 3,828,319 | 8/1974 | Owen et al. | 364/200 |
| 3,970,993 | 7/1976 | Finnila | 364/200 |
| 4,056,821 | 11/1977 | Vittorelli | 364/900 |
| 4,068,298 | 1/1978 | Dechant et al. | 364/200 |
| 4,158,236 | 6/1979 | Levy | 364/900 |
| 4,218,760 | 8/1980 | Levy | 364/900 |
| 4,270,185 | 5/1981 | Asija | 364/900 |

OTHER PUBLICATIONS

IBM System/360 and System/370 (OS) Storage and Information Retrieval System (STAIRS) General Information Manual, P.N. 5734-XR3, 1972.

Martin, *Data-Base Organization*, 2nd Ed., 1975, pp. 558-571.

Primary Examiner—Gareth D. Shaw
Assistant Examiner—Ronni S. Malamud
Attorney, Agent, or Firm—Christie, Parker & Hale

[57] ABSTRACT

The method uses digital data processing means and stored representations of a table of textual block identifiers for locating in a stored textual data base those textual blocks having the best match with a query. Textual block identifiers each provide an indication of a textual block in a stored data base which contains the corresponding word. The method comprises the following steps: A query word is received having representations of a plurality of words to be located in textual blocks in the stored data base. For each of a plurality of the query words, determine a corresponding set of equivalent words which are contained in the stored data base. Each set of equivalent words is equivalent to the corresponding query word. Each equivalent word has a corresponding group of textual block identifiers represented in the stored table. Process the representations of the textual block identifiers in those groups which correspond to the determined equivalent words to thereby form a score for at least one textual block. The score provides an indication of the total number of the sets which have at least one equivalent word in the at least one textual block. The score is utilized to provide output data pertaining to selected textual blocks in the stored textual data base.

28 Claims, 19 Drawing Figures

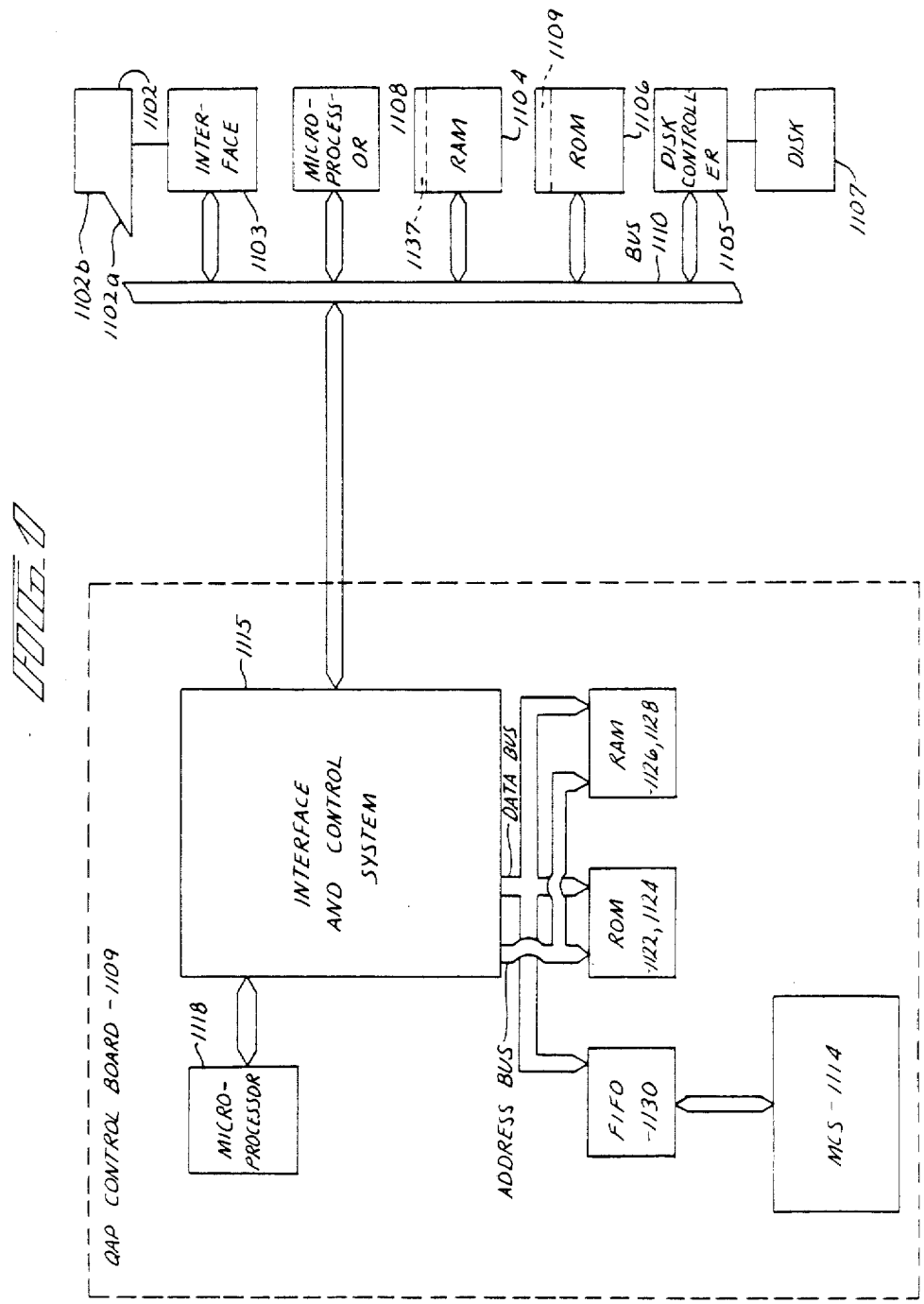

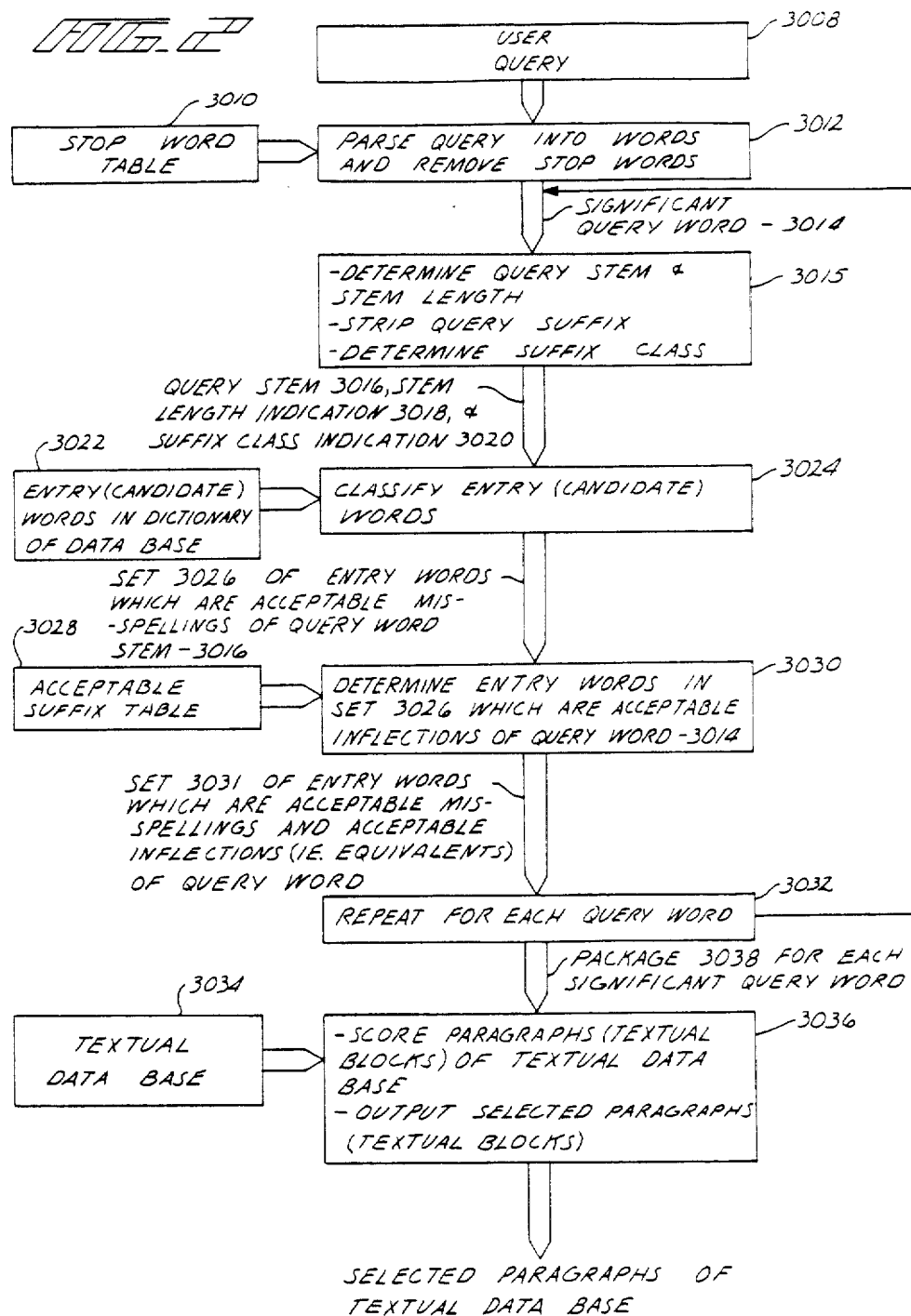

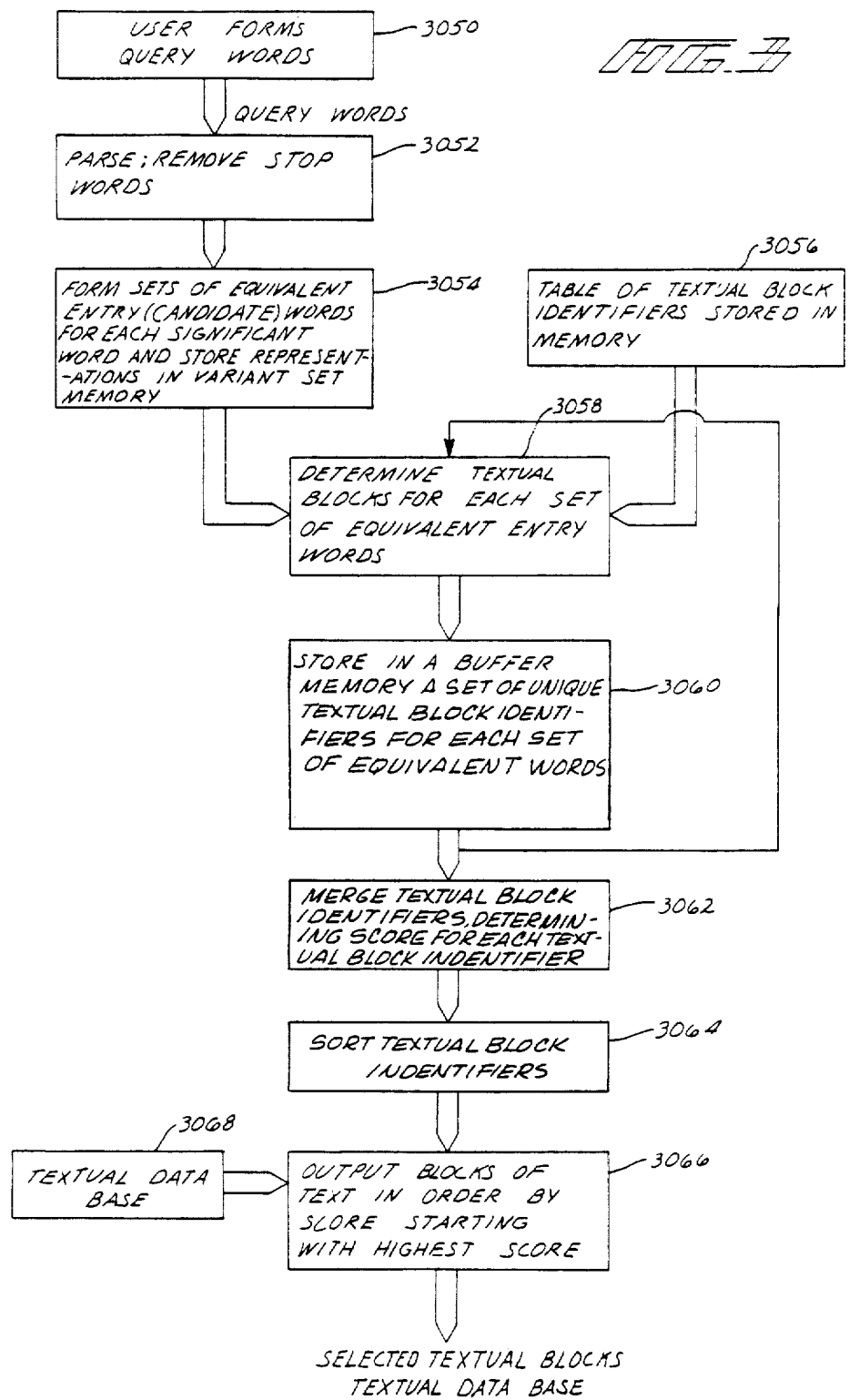

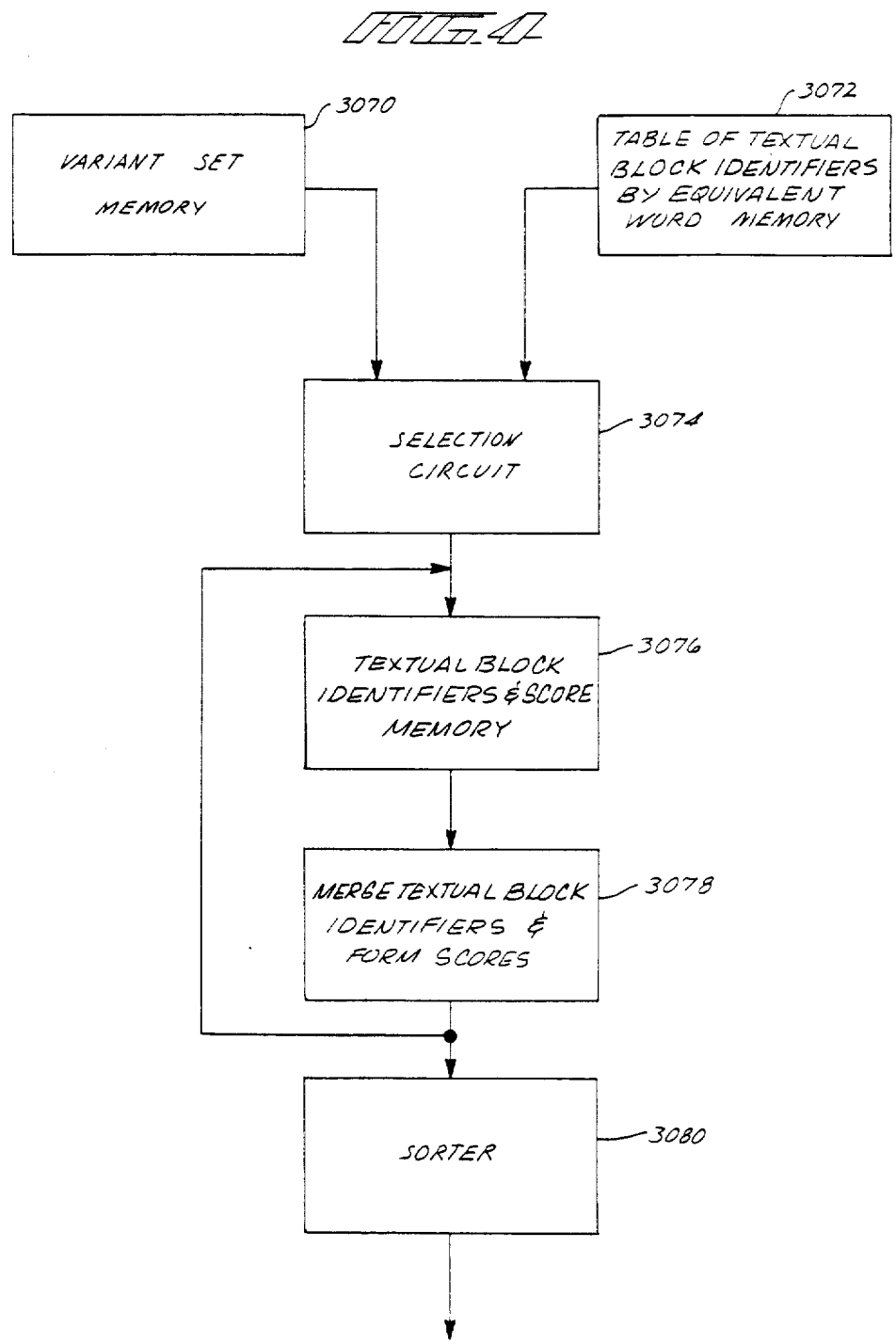

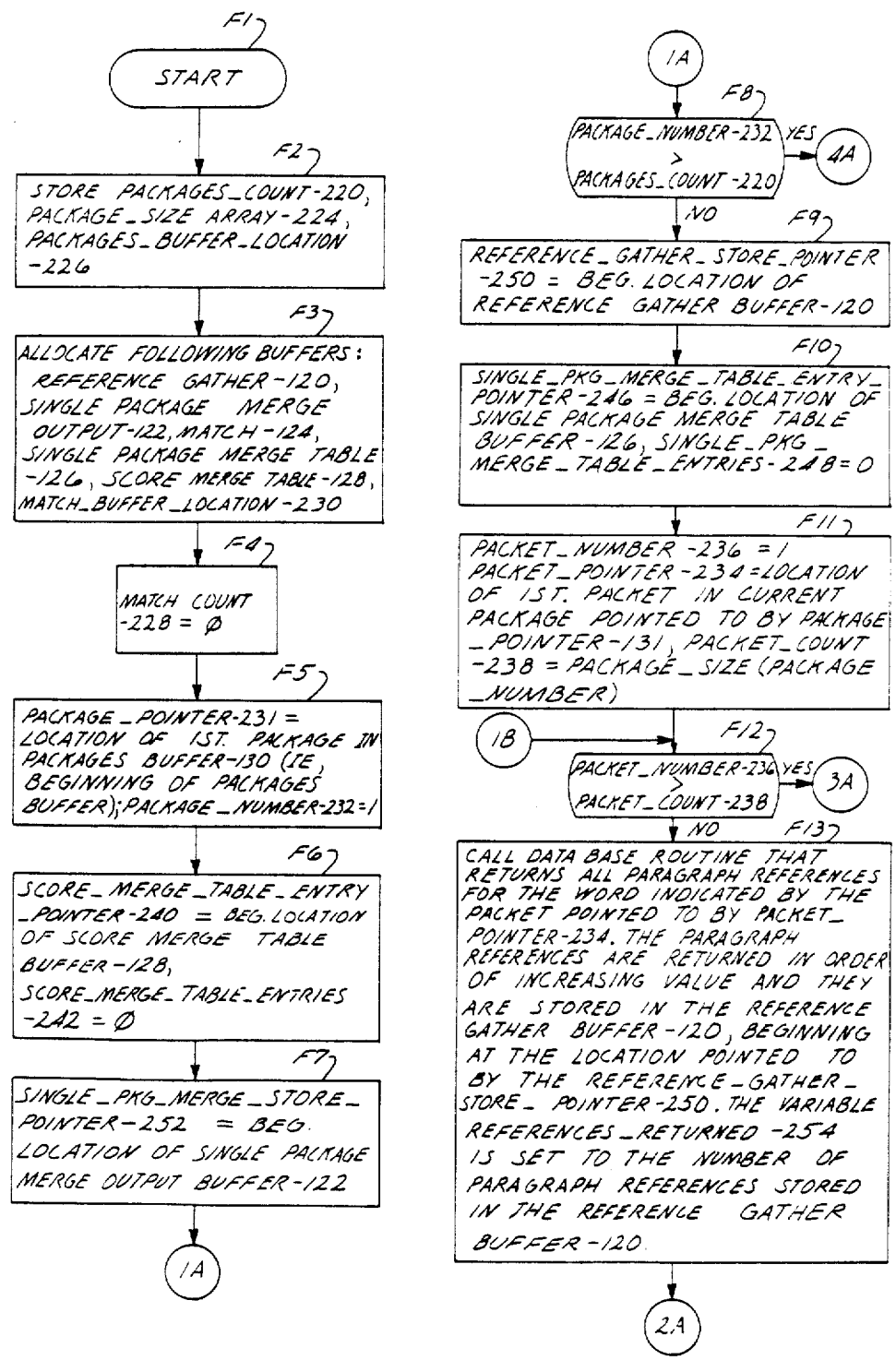

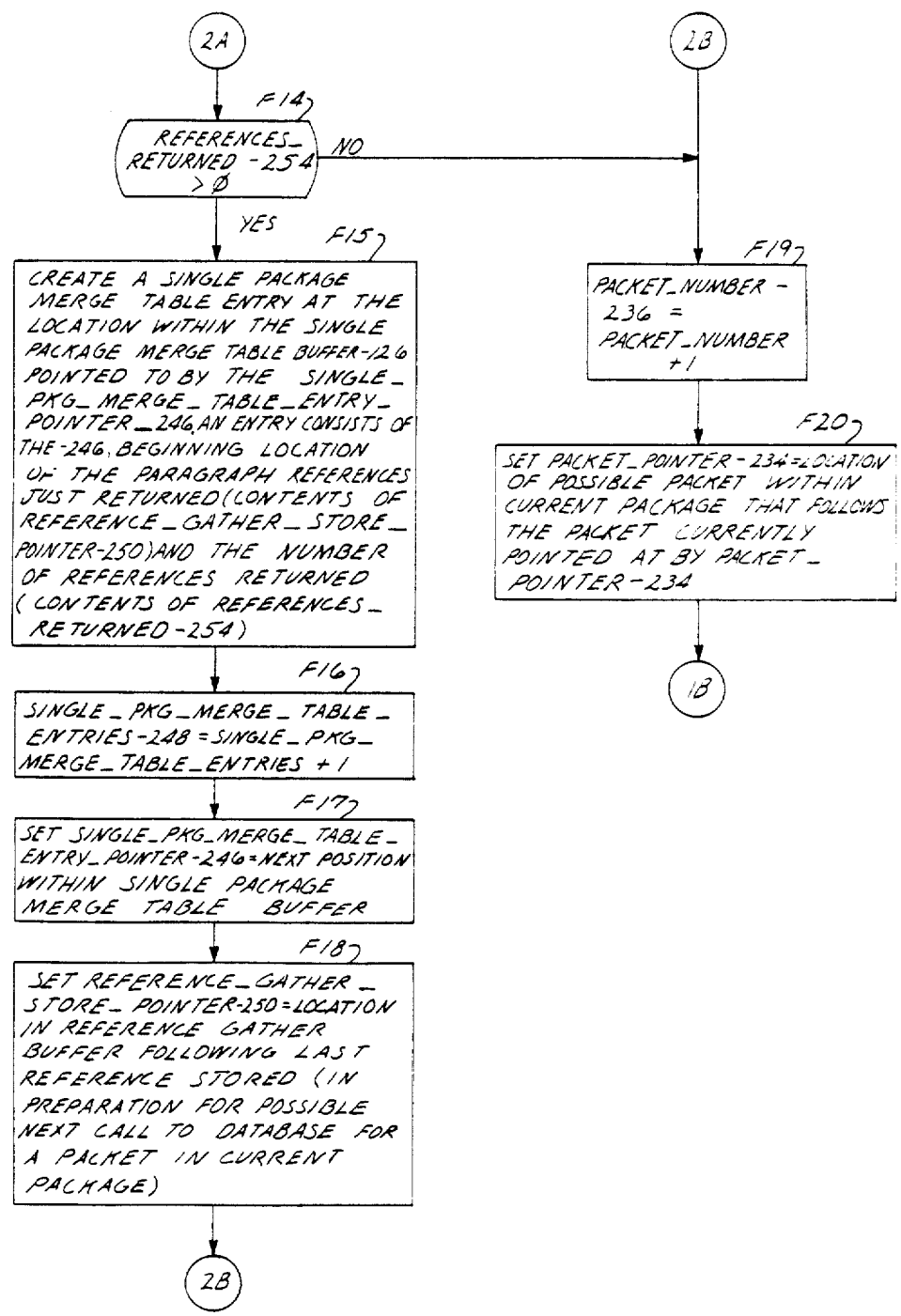

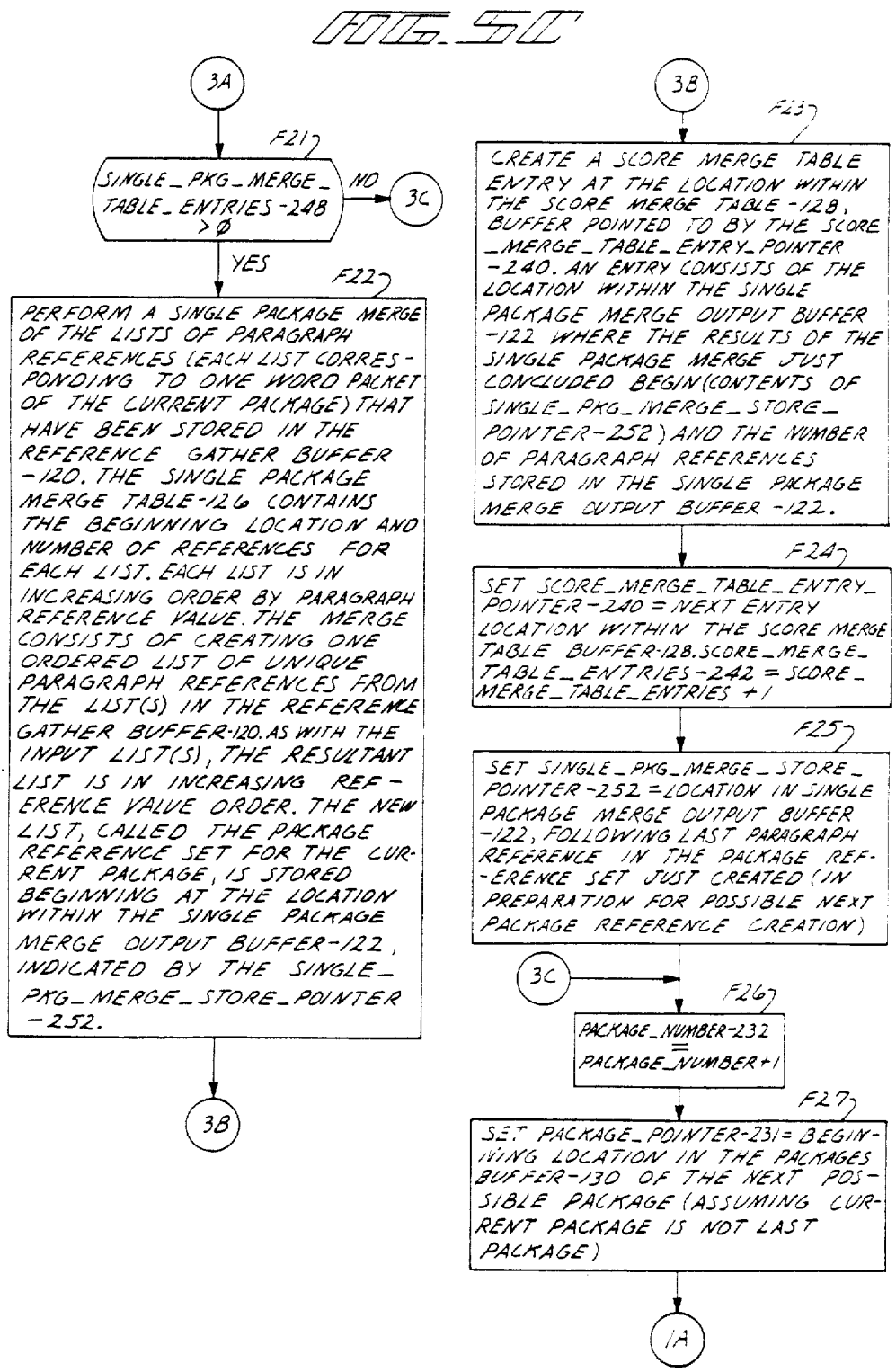

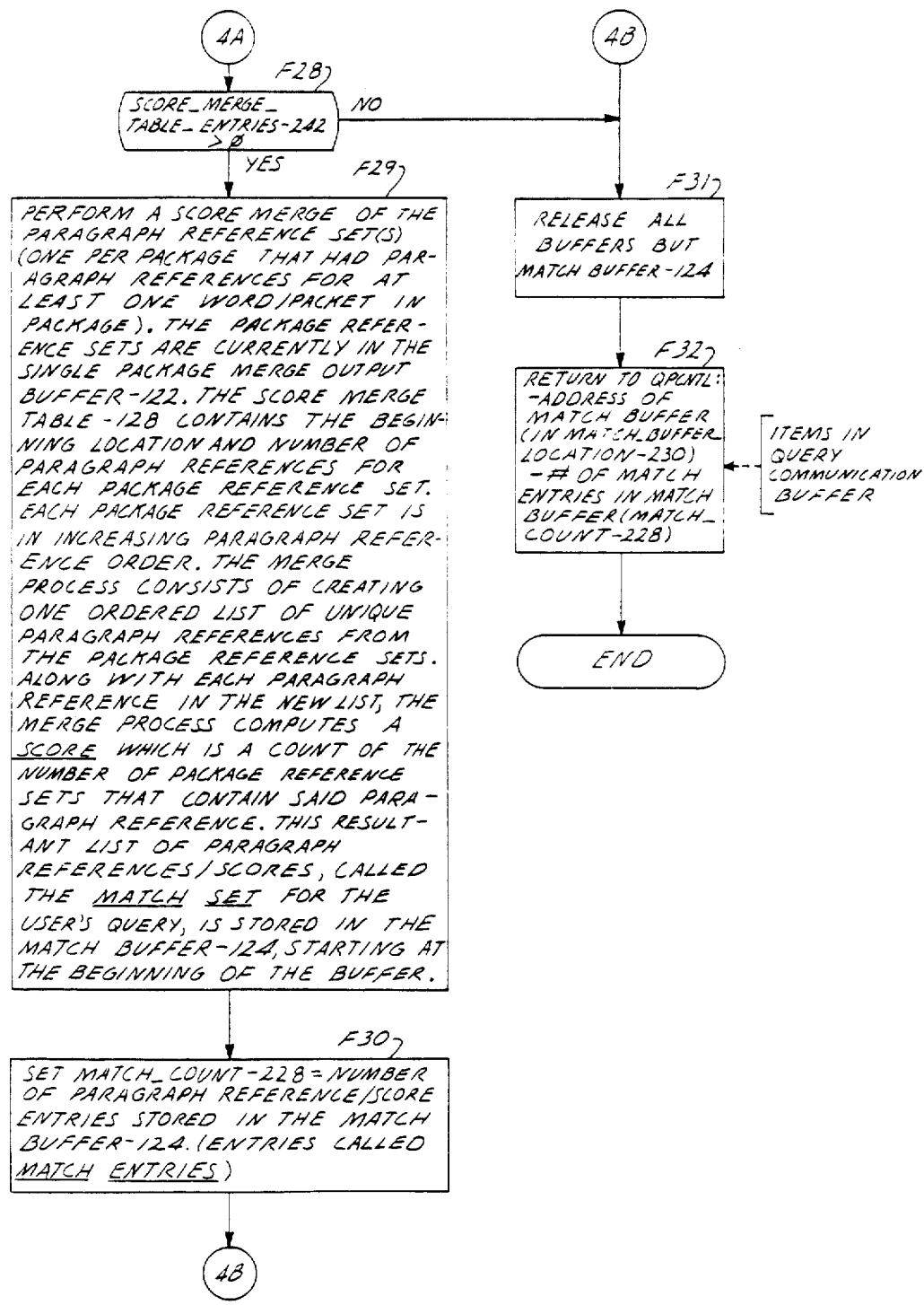

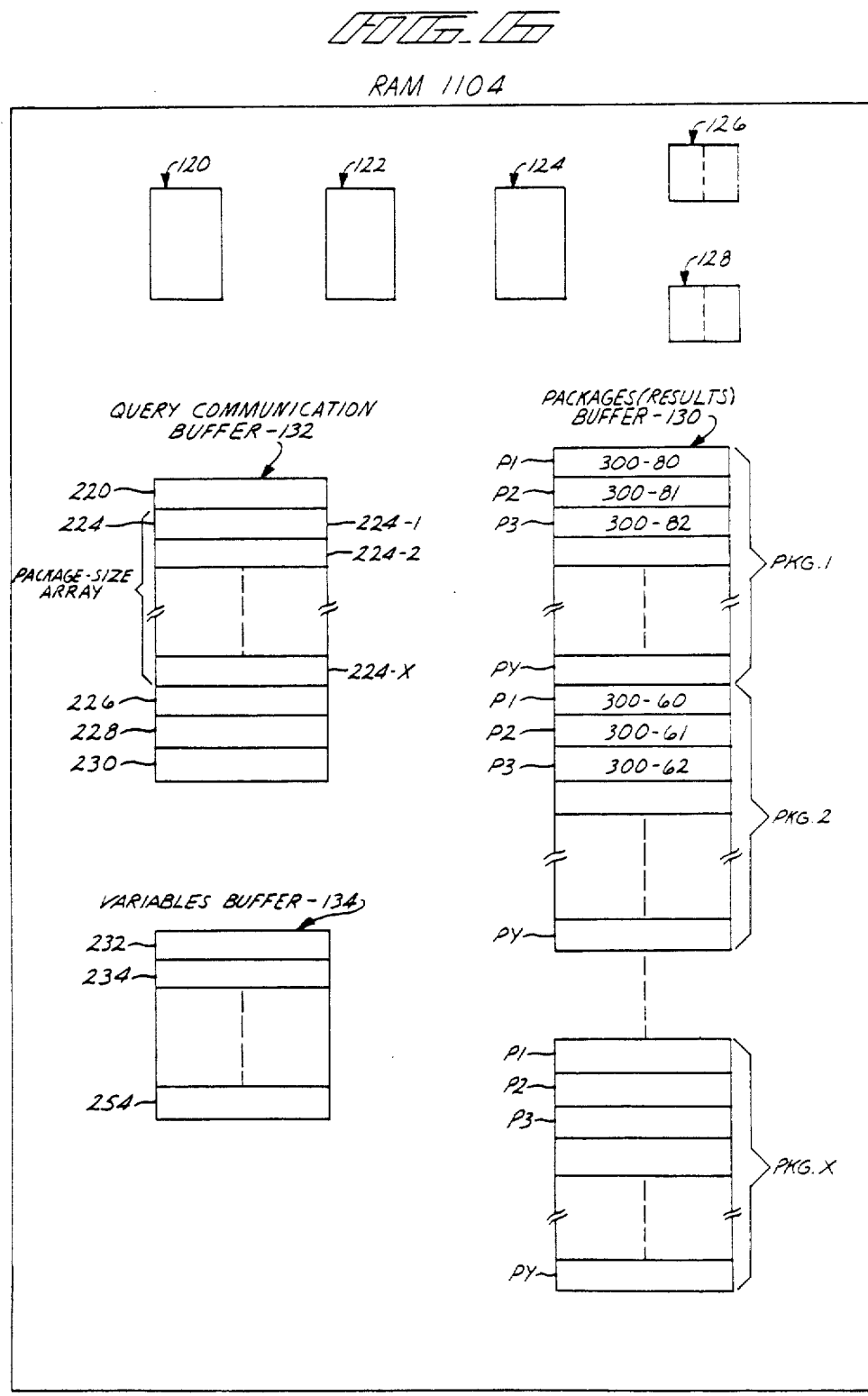

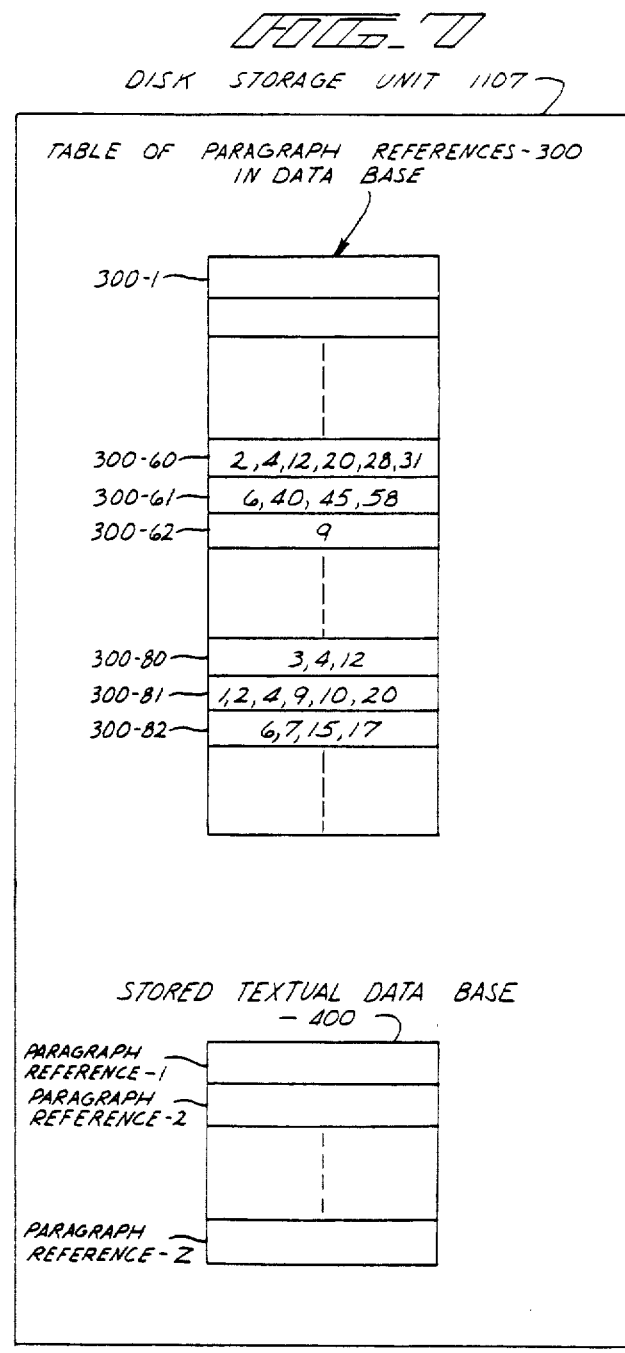

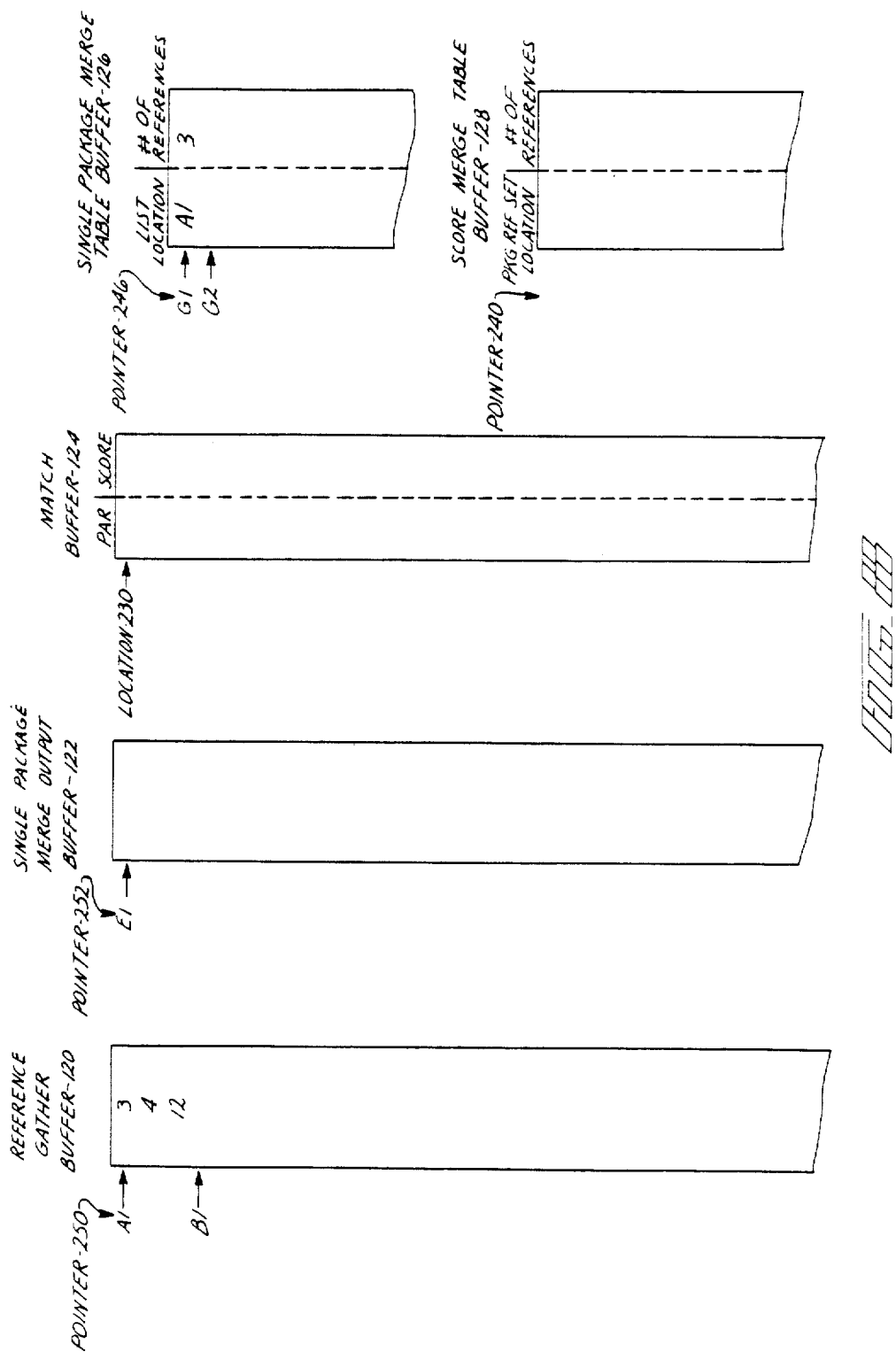

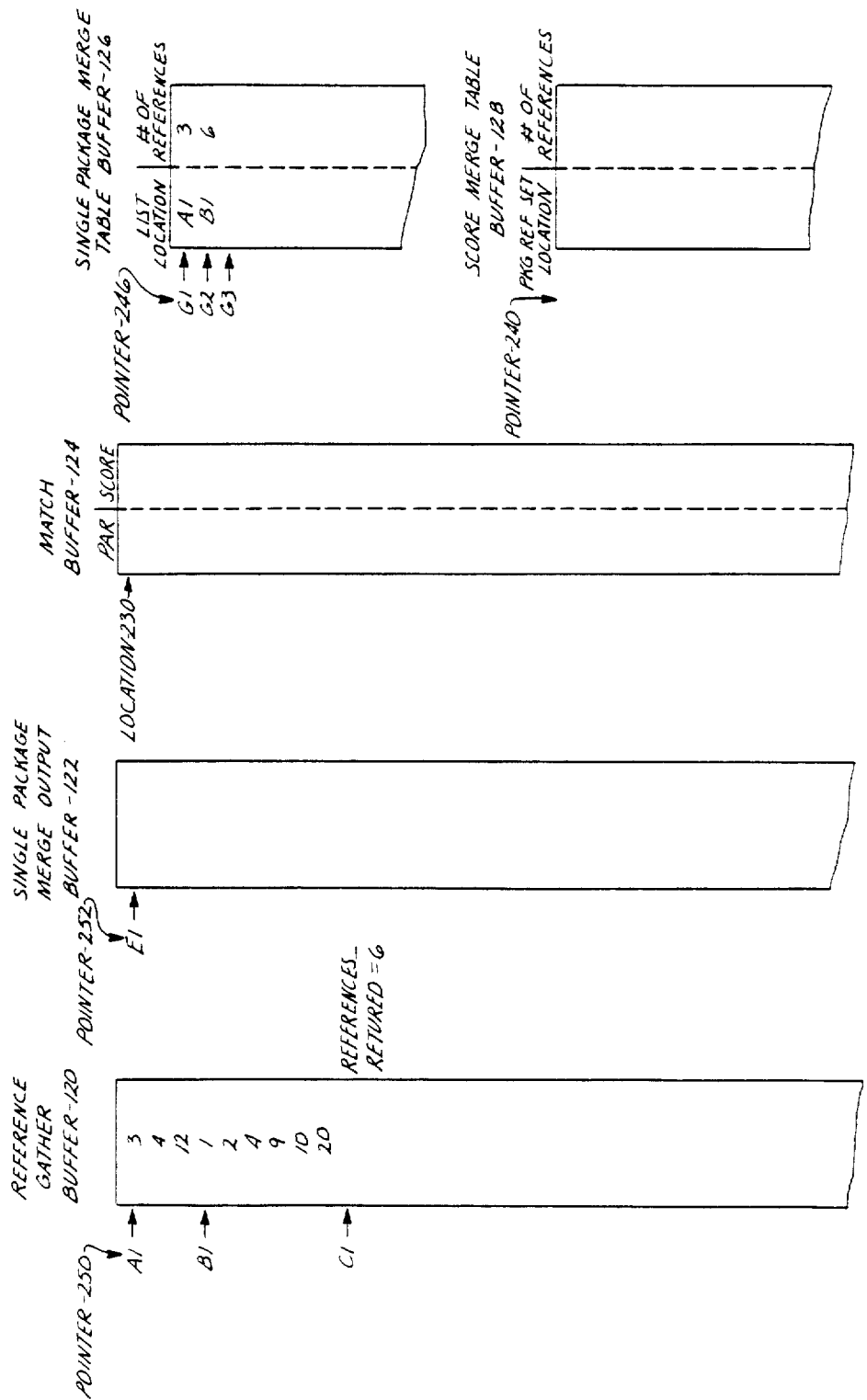

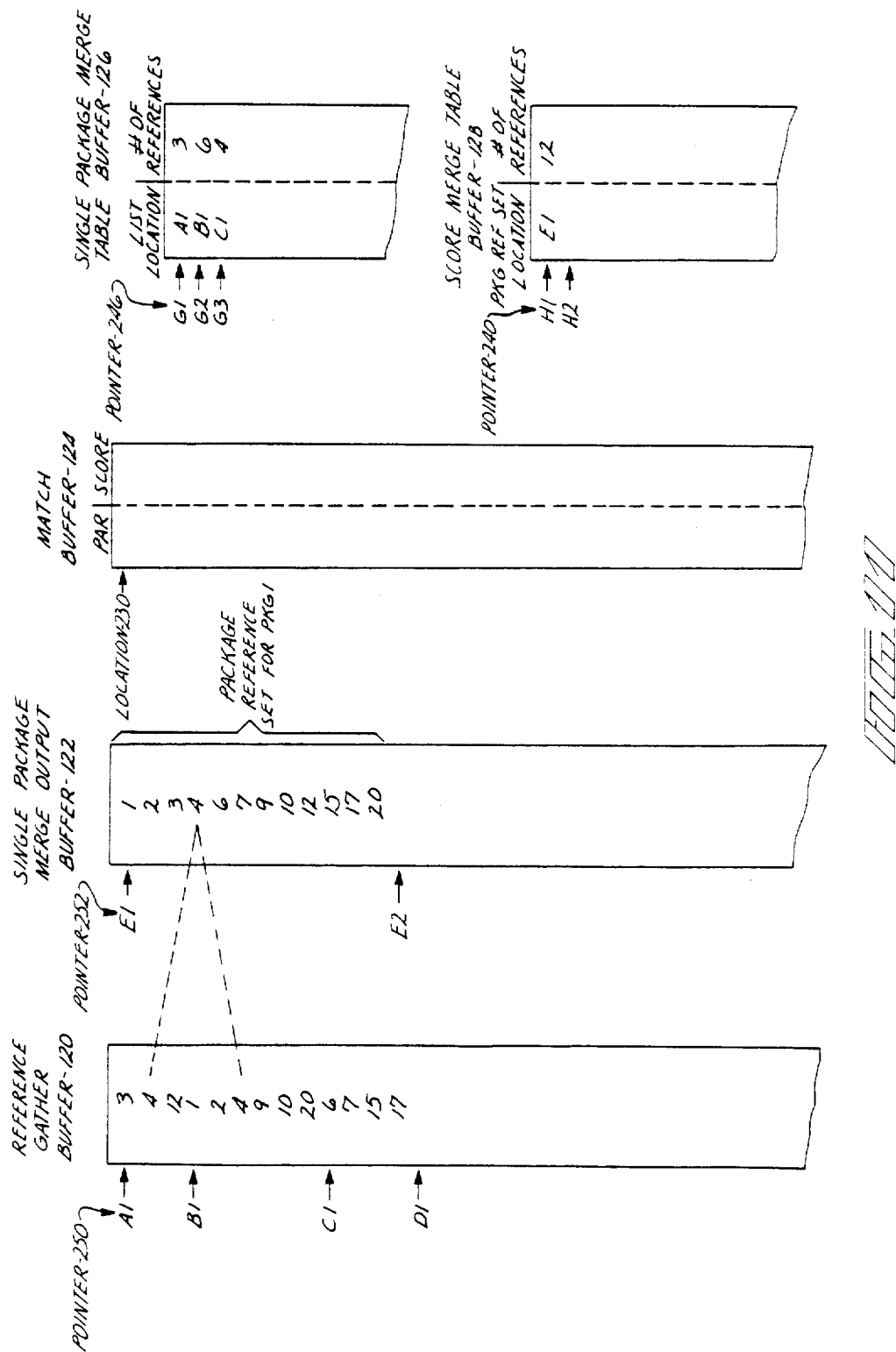

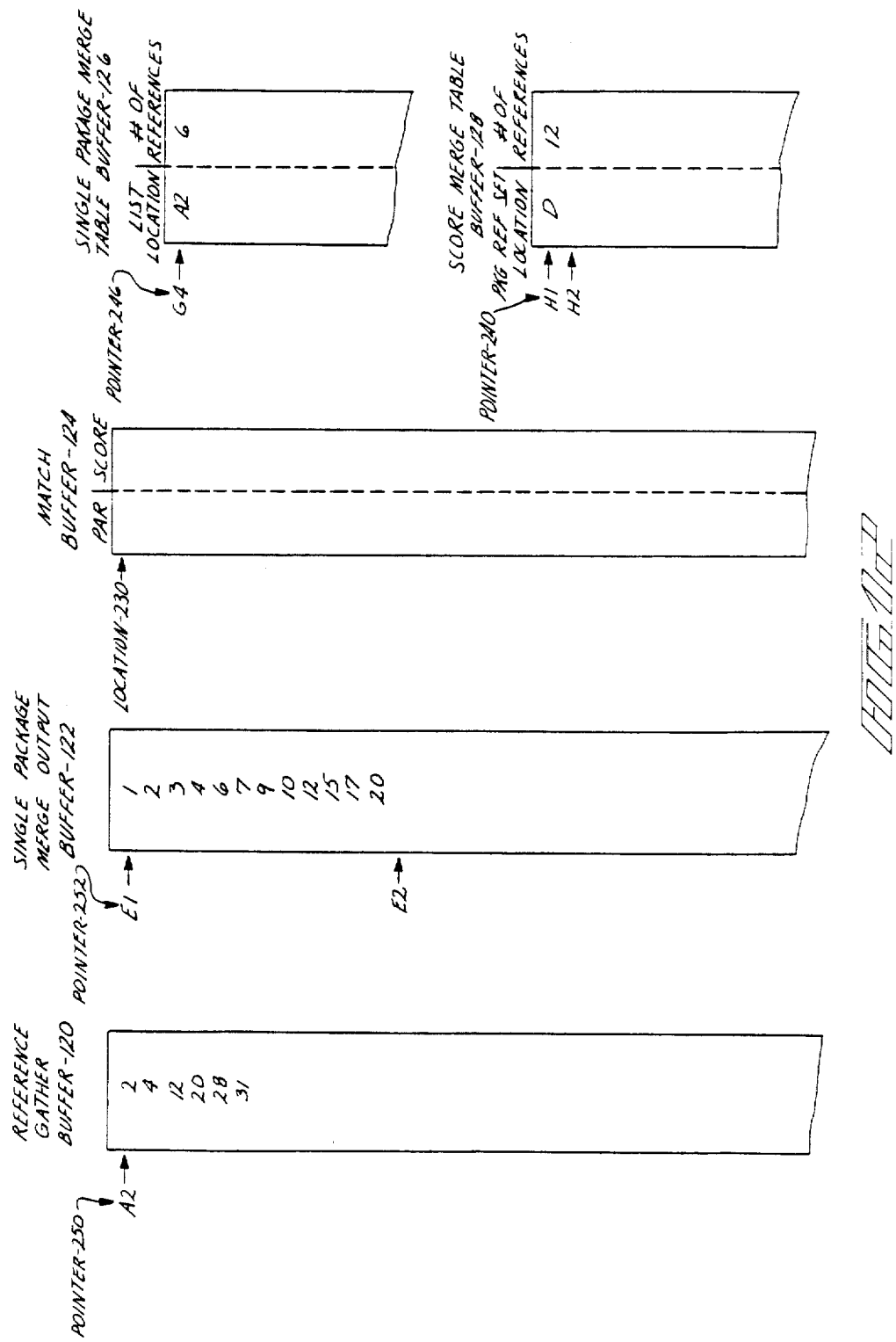

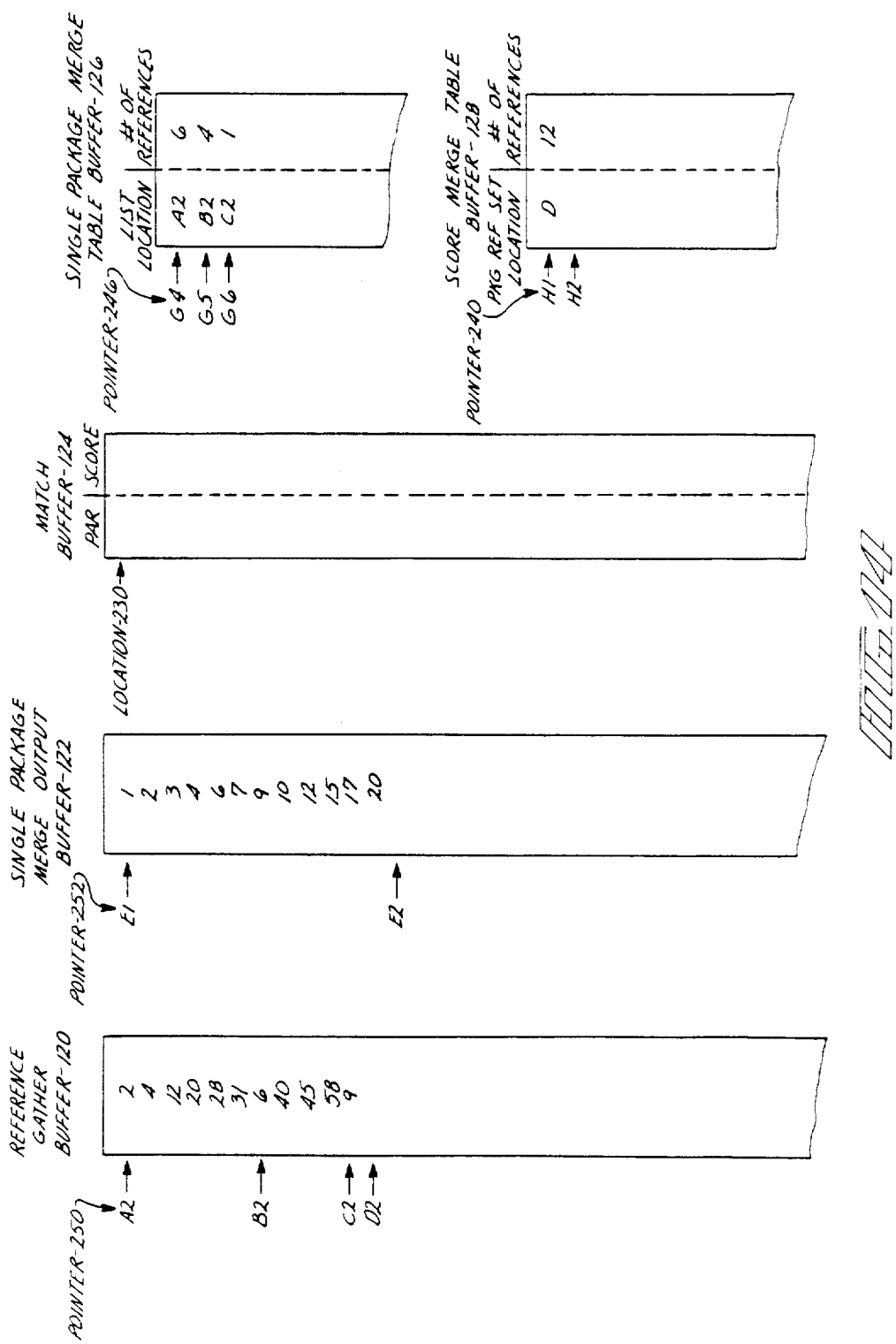

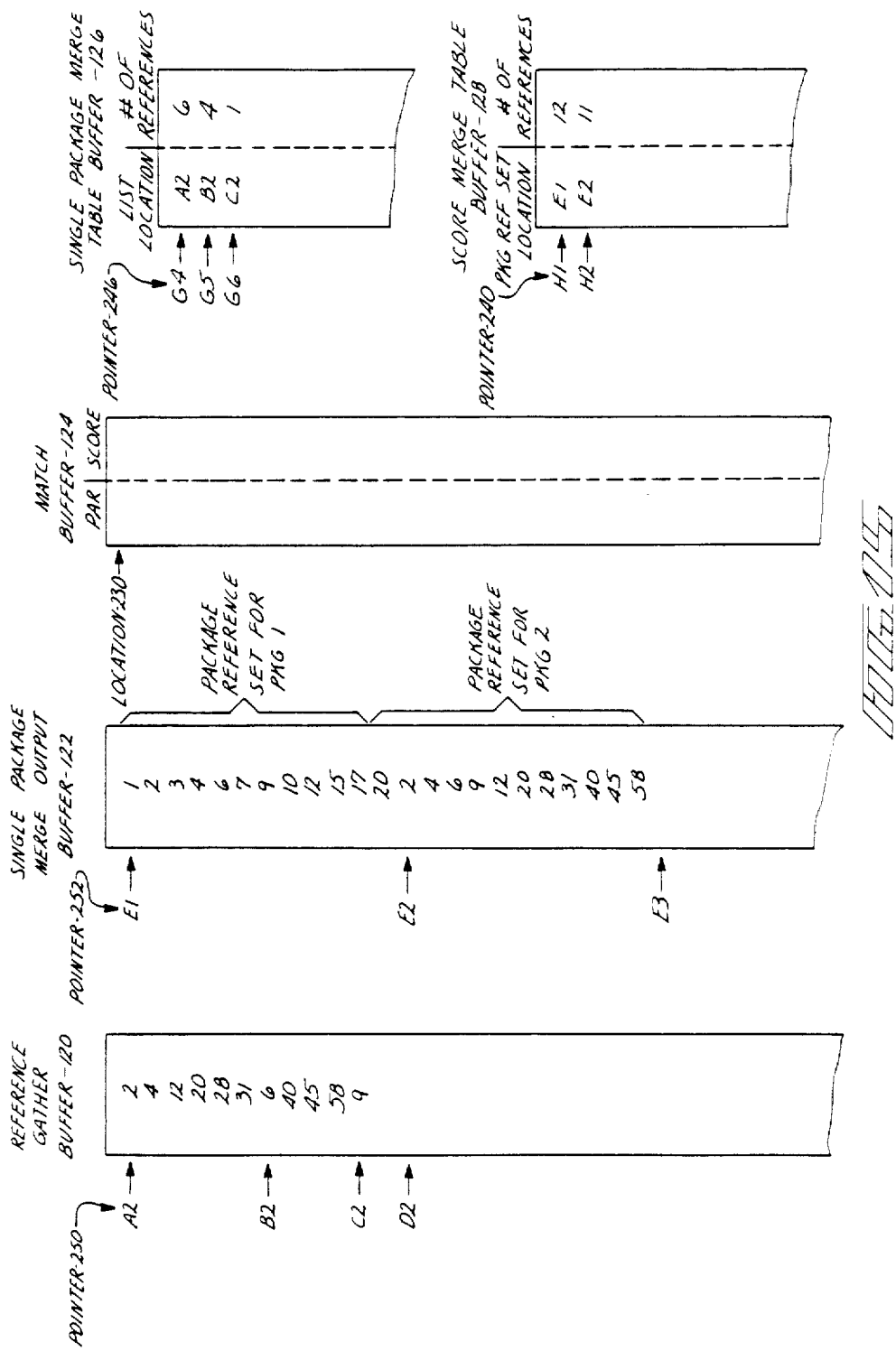

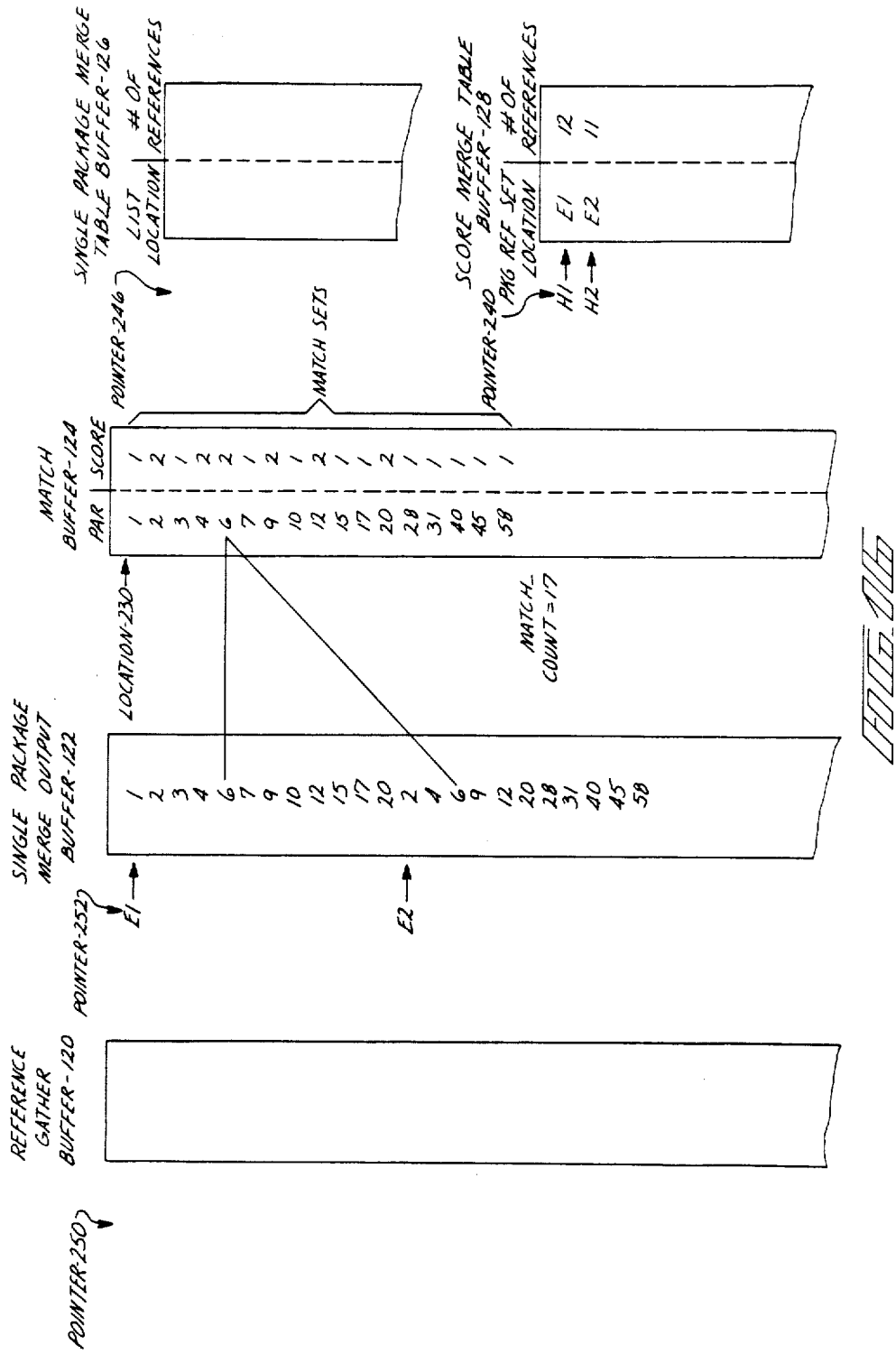

METHOD AND MEANS USING DIGITAL DATA PROCESSING MEANS FOR LOCATING REPRESENTATIONS IN A STORED TEXTUAL DATA BASE

CROSS REFERENCE TO RELATED APPLICATION

This invention relates to subject matter of the following:

The patent application titled "Digital Data Processing Method and Means for Word Classification by Pattern Analysis," filed in the name of Robert V. Dickinson and Louis Michael Galie, and the patent application titled "Digital Data Processing Method and Means by Word Classification Augmented by Ending Analysis," filed in the name of Robert V. Dickinson, Louis Michael Galie, and Craig A. Snow, both applications filed on even date herewith.

The content of the above patent applications are incorporated herein by reference.

BACKGROUND OF THE INVENTION

This invention relates to method and means for locating in a stored textual data base, those textual blocks having the best match with a query composed of multiple words.

Method and means are generally known for locating in a stored textual data base those textual blocks which have the best match with a query. One method and means is disclosed in U.S. Pat. No. 4,068,298. This patent discloses an arrangement whereby techniques called "piping" and "brightness" are used to locate entries in a data base which have the best match with a query. The entries are then scored according to how well they match the original query and, preferably, identifiers for the entries are ordered, using the scores, so that the identifier for a paragraph having the best score appears first and the one that has the poorest score appears last. The user may then read out the actual text of the entries starting with those that have the best score.

Other prior art arrangements employing inverted files are disclosed in Chapter 31, pages 558-571, of the book titled *Computer Data Base Organization*, by James Martin, published by Prentice Hall in 1977. One arrangement referred to is Stairs which uses an inverted file system to score text based on the inclusion of certain words in a block of text.

SUMMARY OF THE INVENTION

The present invention discloses an improved method for locating in a stored textual data base those textual blocks that have the best match with a query.

It has been found that the method and means according to the present invention substantially improves the recall and precision in locating sets of words which are equivalent to a set of query words as compared with the method and means employed in the aforementioned patent. The present invention is also a significant improvement over conventional retrieval methods and systems due to its lack of complicated control structures.

Briefly, a method is disclosed according to the present invention using digital data processing means and stored representations of a table of textual block identifiers for locating in a stored textual data base those textual blocks having the best match with a query. The data base has representations of words grouped into textual blocks. The representations of textual block identifiers are selectable from the table in groups. Each group corresponds to a different word in the stored data base. Each textual block identifier in the representations in each group of textual block identifiers provides an indication of a textual block in the stored data base which contains the corresponding word. The method comprises the following steps: A query word is received having representations of a plurality of words to be located in textual blocks in the stored data base. For each of a plurality of the query words, determine a corresponding set of equivalent words which are contained in the stored data base. Each set of equivalent words is equivalent to the corresponding query word. Each equivalent word has a corresponding group of textual block identifiers represented in the stored table. Process the representations of the textual block identifiers in those groups which correspond to the determined equivalent words to thereby form a score for at least one textual block. The score provides an indication of the total number of the sets which have at least one equivalent word in the at least one textual block. The score is utilized to provide output data pertaining to selected textual blocks in the stored textual data base.

Significantly then, textual blocks are scored for selection and output by the user according to the total number of equivalent sets which have at least one equivalent word in the textual block. This then gives a very good measure of the precision with which the queries match the textual blocks and can be used for selection and output of the textual blocks.

Preferably the textual block consists of a paragraph of the textual data base. In the preferred arrangement the step of processing comprises the step of reading out, from the table, representations of each group of textual block identifiers which corresponds to each equivalent word which is determined in the step of determining.

According to a further preferred arrangement, the step of processing further comprises the step of performing at least one merge sort on representations of the textual block identifiers read from the table in the step of forming a score.

Further, it is preferred that the step of processing comprises the following steps: Merge representations of the textual block identifiers in the groups corresponding to each set of equivalent words into representations of a further group of textual block identifiers for each set of equivalent words without duplicating therein any representations of the same textual block identifier and further processing the representations of a further group of textual block identifiers for each set of equivalent words to thereby form the score.

Preferably the step of further processing comprises the steps of merging representations of textual block identifiers from each of the further groups of textual block identifiers without duplicating therein representations of any of the same textual block identifiers. The step of forming the score comprises the step of forming an individual score, for each of the textual blocks. Each score indicates the number of further groups which contain a representation of at least one textual block identifier corresponding to such textual block.

Additionally it is preferred that the step of processing involves providing a score for each of a plurality of textual blocks. Each score for each textual block provides an indication of the total number of sets which contain at least one equivalent word in the corresponding textual block. Also preferably the step of processing involves the step of forming a score for each of a plurality of textual blocks. The step of utilizing the score to provide output data comprises the step of selecting representations of textual blocks from the stored data base for output. The blocks are indicated by the textual block identifiers. The selected representations of the textual blocks are then output where the blocks are in order corresponding to the score for the corresponding textual block identifiers.

Preferably the representations of textual blocks are output in decreasing value order according to score. Further, it is preferred that the step of processing comprises the step of forming a pointer set. Each pointer set contains a representation of at least one pointer to one of the groups of textual block identifiers. The representations of at least one pointer from the pointer set are utilized to select a textual block identifier from the corresponding group in the stored table.

It is further preferred that the step of determining a corresponding set of equivalent words comprises the steps of selecting words in the data base which are acceptable misspellings and acceptable inflections of the query word.

Preferably, the step of selecting words which are acceptable misspellings and acceptable inflections includes selection of data base words which have an exact match, a character transposition, a single character deletion, and a single character insertion between the stem of a query word and the beginning characters of a data base word.

BRIEF DESCRIPTION OF THE DRAWINGS

FIG. 1 is a block diagram of a digital data processing system embodying means and methods in accordance with the present invention;

FIG. 2 is a flow diagram illustrating the overall operation of the system of FIG. 1;

FIG. 3 is a flow diagram illustrating the sequence of operation of the system of FIG. 1 which generalizes the initial steps of the process and goes into more detail in the latter steps of the process;

FIG. 4 is a schematic block diagram of digital data processing means for performing the scoring method;

FIG. 5, consisting of FIGS. 5A through 5D, is a detailed flow diagram depicting a portion of the sequence of operation of the digital data processing system of FIG. 1 related to the scoring method;

FIG. 6 is a schematic block diagram of various buffers contained in RAM 1104 utilized in the operation illustrated in FIG. 5;

FIG. 7 is a schematic and block diagram of portions of the textual data base stored in the disk storage unit 1107 and utilized by the digital data processing system of FIG. 1 during the operation depicted in FIG. 5;

FIGS. 8 through 16 are block diagrams providing examples of the storage content of certain buffers depicted in FIG. 6 while carrying out the method illustrated in FIG. 5 on the packages contained in the PACKAGES BUFFER 130 of FIG. 6 and with the paragraph references contained in the TABLE OF PARAGRAPH REFERENCES 300 of FIG. 7.

Detailed Description

INDEX

Figure 10:
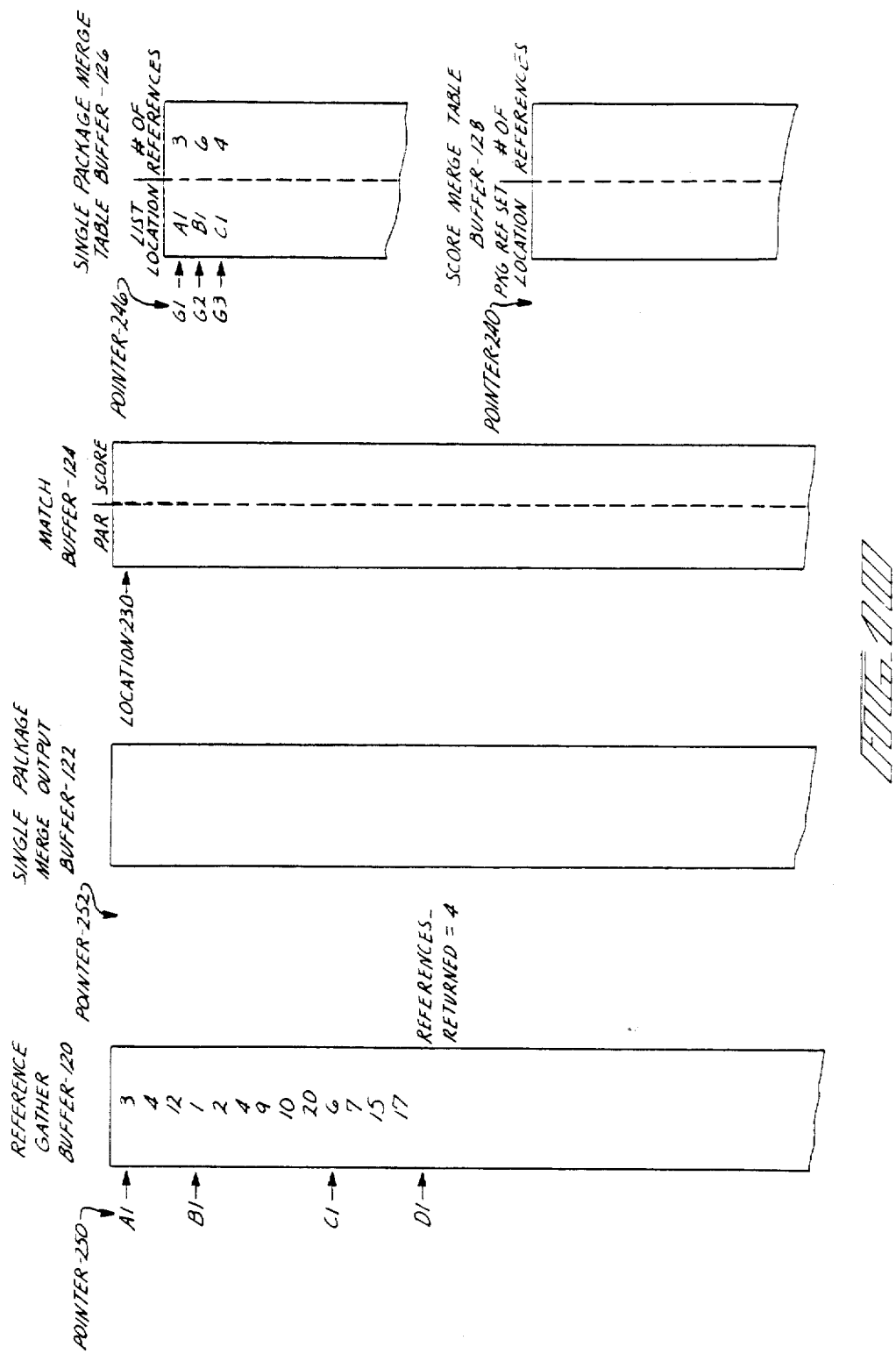

I. GENERAL DESCRIPTION
  A. COMPUTER PROGRAM METHOD AND MEANS
    1. INTRODUCTION
    2. SUMMARY OF METHOD
    3. SUMMARY OF METHOD AND MEANS FOR LOCATING TEXTUAL BLOCKS
  B. DETAILED DESCRIPTION OF METHOD AND MEANS OF FIGS. 1 AND 5
II. TABLES
  A. INDEX OF TABLES
    1. BUFFERS USED IN QDCMD METHOD AND MEANS
    2. VARIABLES USED IN QDCMD METHOD AND MEANS
    3. EXAMPLE OF TEXTUAL DATA BASE
    4. EXAMPLE—TABLE OF PARAGRAPH REFERENCES (PARAGRAPH IDENTIFIERS) IN DATA BASE
    5. EXAMPLE OF PARAGRAPH REFERENCES AND CORRESPONDING SCORES FOR THE QUERY WORDS "RATES" AND "INTEREST"
    6. EXAMPLE OF PARAGRAPH REFERENCES (TEXTUAL BLOCK IDENTIFIERS) AND CORRESPONDING SCORES AFTER SORT OPERATION

I. GENERAL DESCRIPTION

A. COMPUTER PROGRAM METHOD AND MEANS

1. INTRODUCTION

FIG. 1, the details of which are disclosed in the above-identified patent applications, is a schematic and block diagram of a programmable digital data processing system. Included are hardware and computer programs, the latter being stored in read only memory, for locating and determining candidate (also called entry) words contained in a stored data base which are both acceptable misspellings and acceptable inflections of query words. The data base preferably is a textual data base arranged into paragraphs and records. Hardware and software are also included that use the entry words which are acceptable misspellings and acceptable inflections of the words of the query and scores the paragraphs of the data base according to how well the paragraphs match the acceptable entry words. Representations of the paragraphs of the data base are returned to the user in decreasing order by score, the best scored paragraph being returned first.

Referring to FIG. 1, a user using terminal 1102 enters query words, each word composed of one or more characters, into the system. External circuits including interface 1103, microprocessor 1108, random access memory (RAM) 1104, and read only memory (ROM) 1106 then parse the words of the query and throw away those words which have little or no significance to the query, called stop words. The remaining query words are referred to as the significant words of the query. The significant words of the query after parsing are stored in RAM 1104 and are then taken one by one and used to interrogate entries in a stored data base to locate those data base entry words which are both an acceptable misspelling and an acceptable inflection of the significant query words. Representations of the entry words of the data base are stored in various forms in a memory, namely, external disk storage device 1107, and as required are transferred through a disk controller 1105 to a random access memory (RAM) 1104 for processing.

QAP control board 1109 is a programmable microprocessor system. More particularly the QAP control board 1109 contains a microprocessor 1118 and a misspelling classification system 1114 which in turn also contains a programmable microprocessor. Also included in the system are two read only memories which for convenience are shown as one and is designated herein as read only memory (ROM) 1122,1124, two random access memories which for convenience are shown as one and is designated herein as random access memory (RAM) 1126,1128, and a first-in first-out (FIFO) memory 1130. An interface and control system designated generally at 1115 provides an interface between the microprocessor 1118 and the bus 1110 and hence the rest of the external circuits to the right of bus 1110. The interface control system 1115 also provides an interface between microprocessor 1118 and ROM 1122,1124, RAM 1126,1128, and FIFO 1130. The FIFO 1130 provides the main communication for transferring data between the MCS 1114 and the microprocessor 1118.

The programs which control the operation of the microprocessor 1118 are stored in the ROM 1122,1124. RAM 1126,1128 provides a scratch pad memory as well as a storage for various values utilized by the microprocessor 1118 in its operation.

Briefly, representations of each significant query word are transferred from RAM 1104 to RAM 1126,1128. There the microprocessor 1118 takes the query words, one at a time, strips the suffix from the query words, leaving a stem, and forms a suffix classification indication for the query words. The query words are then passed through the FIFO 1130 to the MCS 1114. In addition, the family of entry words for the query word are transferred from RAM 1104 through the FIFO 1130 to the MCS 1114. The microprocessor in the MCS 1114 then takes the stem of each query word, compares it against the beginning characters of the entry words, and, for each entry word, determines a misspelling classification. Those entry words determined to have an acceptable misspelling classification as compared to the query word stem are then transferred back along with the misspelling classification for the entry word to the FIFO 1130 and from there to the RAM 1126,1128. At this point, then, the RAM 1126,1128 contains the entry words which are acceptable misspellings of the corresponding query word, the length of the stem of the corresponding query word, and the suffix classification indication for the corresponding query word. The microprocessor 1118 then utilizes the length of the stem and the misspelling classification value to determine the position of the suffix in each entry word and further uses the suffix classification indication to determine if each of the entry words is an acceptable inflection of the original query word. Those entry words which are acceptable misspellings and further are acceptable inflections of the original query word are called equivalent words to the query and representations of those equivalent words are then transferred back to the RAM 1104 where they are used to form packages for scoring and output to the user, as explained hereinafter in more detail.

2. SUMMARY OF METHOD

With the overall block diagram of the system of FIG. 1 in mind, consider now the overall flow diagram of FIG. 2. Initially as depicted at 3008, the user, using the keyboard 1102A of the operator console 1102 (FIG. 1), forms a query. The query consists of one or more query words which the user would like to find in combination in a paragraph of the textual data base stored in the disk 1107. By way of example, the query words may be "RATES OF INTEREST."

As depicted at block 3012 the data processing system of FIG. 1 then uses a table of stop words 3010 to identify and remove the stop words from the query leaving significant query words. The significant query words are then passed to the rest of the flow, one by one.

Each query word is processed as depicted at 3015 by determining the stem of the query word and the length of the stem of the query word. Additionally, the suffix of the query word is stripped from the query word, leaving only the stem. The suffix of the query word alone or in combination with the adjacent portion of the stem is used to determine a class of acceptable suffixes for the stem of the query word. To be explained in more detail, the class of acceptable suffixes will be used to determine whether entry (candidate) words whose beginning characters are acceptable misspellings of the stem of the query word have an acceptable suffix and therefore the entry word is both an acceptable misspelling and an acceptable inflection of the query word. Therefore, after block 3015 of the flow, the system will have determined, for each query word of the query, the following: a query stem 3016, which is the original query word with the suffix removed, (i.e., for the word RATES, the suffix "ES" is stripped leaving the query stem RATE); a stem length indication 3018, which indicates the length of the stem (i.e., for the query word RATES the stem length will be 3); and a suffix class indication 3020 indicating the class in which the suffix of the query word is contained.

The textual data base contains entry words. One portion of the textual data base is a dictionary of entry words which are stored and are accessible by the first two letters. All of the words having the same first two letters are stored together. For example, representations of signficant words beginning with the letters AA are arranged together, representations of significant words beginning with the letters AB are arranged together, etc. The data base entry words which have the same first two characters are called a family of data base entry words. Such an arrangement of the entry words is a preferred arrangement of the data base but is not essential to the present invention.

The family of entry words corresponding to one of the query words is first processed at block 3024 of the flow by comparing the query stem 3016 with the beginning characters of each of the entry words in the corresponding family of query words, thereby forming a set 3026 of entry words which are acceptable misspellings of the query word stem 3016. Therefore, the family of entry words corresponding to the query word is reduced to a set of entry words whose beginnings are acceptable misspellings of the query word stem.

During block 3030 of the flow the entry words in set 3026 whose beginning characters are acceptable misspellings of the query word stem 3016, are then checked to determine if they are acceptable inflections of the original query word. To this end the suffix class indication 3020 for the query word is used to access an acceptable suffix table 3028 from which acceptable suffixes are obtained and compared against the entry words in set 3026 to determine those which have acceptable suffixes and are therefore acceptable inflections. Following block 3030 there is a set 3031 of entry words which are acceptable misspellings and acceptable inflections of the query word and are called equivalent words to the query word.

During block 3032 of the flow the system forms a package 3038 for the query word which has a packet for each entry word of set 3031. Each packet contains a set of coded information or indications which may be used to locate information about the corresponding entry word in the stored data base. Of interest to the present invention is that each packet has indications which, as described below, are used to locate each of the documents and/or paragraphs within the document in which the corresponding entry word is contained in the textual data base.

The steps of the method in blocks 3015, 3024, 3030 and 3034 are then repeated for another significant query word to thereby locate those entry words which are both acceptable misspellings and acceptable inflections (of the type discussed above) for the next query word. A package 3038 is formed for the next query word and contains a packet for each of the entry words which is an acceptable misspelling and an acceptable inflection of the corresponding query word. This process is repeated for each of the significant words of the query with a package being formed for each of the query words in the manner discussed above.

Using the packages 3038, one for each of the query words, during block 3036 of the flow, paragraph references are obtained which identify the actual paragraphs (and, if desired, documents) in which each of the equivalent words is contained. The paragraph references for each paragraph in the textual data base are then scored according to how well they match the equivalent words, and finally, at block 3044, paragraphs of the data base corresponding to the paragraph references which have been scored will be output for visual display on the CRT of the operator console 1102. The textual data base containing the actual paragraphs of text is generally depicted at 3034 in the flow and is accessed and read out using the paragraph references and employing techniques well known in the data processing art.

The method for locating in the stored textual data base those textual paragraphs and records, generally called textual blocks, which have the best match with the words of a query, and the way in which the textual blocks are output to the user will be discussed in more detail in the following section.

3. SUMMARY OF METHOD AND MEANS FOR LOCATING TEXTUAL BLOCKS

A method is depicted in FIG. 3 for using a digital data processing system, such as that in FIG. 1, for determining the matches between a textual data base and the combination of words in a given textual query. A scoring technique is employed which ranks the textual blocks with respect to other textual blocks in the data base, based on the number of equivalent words of the query contained in the textual blocks.

Referring to FIG. 3, the digital data processing system carries out the following method. During flow block 3050 the user forms representations of words of a query in the system on operator terminal 1102. As a result these query words are received by the system. The query is a combination of query words which the user desires to locate in a single textual block of the data base stored on the disk 1107. By way of example herein, each textual block is a paragraph within a document.

Table 3 gives, by way of example, a textual data base stored on the disk 1107. Referring to Table 3 three documents, are indicated. Document 1 has paragraphs 1 through 9, document 2 has paragraphs 1 through 20, and document 3 has paragraphs 1 through 29. By way of example herein, the textual blocks are numbered consecutively beginning with the first paragraph of document 1 and ending with the last paragraph of document 3, as depicted on the left-hand side of Table 3. Table 3, for simplicity, does not contain all of the sentences of all of the paragraphs. Only those sentences within each paragraph which are of interest are depicted. The query is by way of example, the words "RATES OF INTEREST." At block 3052 of FIG. 3 query is parsed and the stop word "OF" is removed, leaving the significant query words "RATES" and "INTEREST." During block 3054 the data processing system forms a set of equivalent entry words and they are stored in a memory called a variant set memory. This memory is, by way of example, the RAM 1104 in FIG. 1.

Blocks 3050, 3052 and 3054 of the flow of FIG. 3 correspond generally to flow blocks 3008 through 3032 of the flow diagram of FIG. 2. Therefore, following block 3054 in the flow, the variant set memory contains a set of representations of equivalent words (i.e., a package) for each of the significant words of the query. The equivalent words are preferably the entry words from the data base which are acceptable misspellings and acceptable inflections of the significant words of the query which are determined as discussed above. The representations of the equivalent words give information about the equivalent words such as pointers to where the words can be found in the textual blocks.

Table 4 provides an example of a list of the words from the data base which are equivalents of the significant query words RATES and INTEREST. By way of example, the equivalent words to the query word INTEREST are the words INTEREST, INTERESTING, and INTERET. The equivalent words for the query word, RATES are RATE, RATES, and RATING. Table 4 is also shown an example of the contents of a portion of a table of textual block identifiers contained in the data base and stored on the disk 1107. There is a storage location for the table which corresponds to each of the different entry words in the data base. The storage location corresponding to each entry word contains one or more textual block identifiers (also paragraph references) identifying each of the textual blocks (paragraphs and documents) in which the corresponding entry word is located. For example, referring to Tables 4 and 3, the entry word INTEREST is located in: document 1, paragraph 2, corresponding to textual block identifier 2; document 1, paragraph 4, corresponding to textual block identifier 4; paragraph 3, document 2, corresponding to textual block identifier 12; etc. The flow diagram of FIG. 3 depicts the table of textual block identifiers at 3056.

During block 3058 of the flow the data processing system is operative for determining, for each equivalent entry word in each set, the corresponding textual block identifiers stored in Table 3056. Thus Table 4 depicts equivalent entry words on the left and the corresponding textual block identifiers on the right.

Consider now the principle involved with scoring. Preferably, each textual block found is separately scored with a value which represents the total number of sets which contain at least one equivalent word the same as in the textual block. No more than one incremental value is assigned to any one textual block even though one set might contain more than one equivalent word which is the same as one or more words in the same textual block.

Table 5 is provided by way of example to indicate the various textual block identifiers for the sets of equivalent entry words depicted in Table 4 and the resulting scores. One equivalent set consists of the words RATE, RATES, and RATING and the second set consists of INTEREST, INTERESTING, and INTERET. Referring to Tables 3 and 4, textual block 1 contains the equivalent entry word RATES but does not contain any of the equivalent entry words from the set corresponding to the word INTEREST. Accordingly, its score is 1. However, textual block 4 contains the words RATE, RATES, and INTEREST but only receives a score of 2. The score is a count made by counting one for each of the two sets of equivalent words containing one word (or more than one word) matching a word in textual block 4. In other words an additional count is not given for having both the words RATE and RATES within the same equivalent set. Similar analysis may be used for determining the scores for the other textual blocks as summarized in Table 5.

For all queries in words of text, the maximum paragraph score possible is N where N is the number of sets of equivalent words. All integral scores from zero to N are possible. The system can also be arranged so that textual blocks which contain none of the equivalent words score zero and are judged as irrelevant to the query. Paragraphs containing at least one equivalent word are potentially relevant. Those textual blocks which contain more equivalents are more likely to be relevant than textual blocks which contain fewer equivalent words. "Equivalent words" as used herein are intended to include words which are an exact match to the corresponding query word as well as those words which are acceptable misspellings and inflections of the query words and those words which are synonyms of the acceptable misspellings and inflections of the query words.

It is important to note that the number of times a given equivalent word occurs in a textual block is not germane. For example, a textual block containing a given equivalent word nine times only receives a score of 1 for each set of equivalents containing that word.

Return now to the flow of FIG. 3 and consider the way in which the system operates. During block 3060 the data processing system stores, in a buffer memory, a textual block identifier from Table 3056 corresponding to each equivalent word in each equivalent word set. A separate set of textual block identifiers is stored for each set of equivalent words (and hence for each significant query word).

During block 3060 the textual block identifiers are merged, eliminating duplicate textual block identifiers, and each resultant textual block identifier is scored. The score, for each particular resultant textual block identifier, gives the number of different sets of equivalent words which have at least one equivalent word in the textual block which corresponds to the particular textual block identifier. This is accomplished by counting the number of different sets in which a textual block identifier occurs without adding a count because the textual block identifier occurs more than once in the same set.

During block 3064 of the flow the textual block identifiers are sorted by score so that the textual block identifiers are in descending order by the value of the score. Table 6 depicts the textual block identifiers of Table 5 sorted into descending order by score with the textual block having the highest score first and the textual blocks having the lowest score at the end. Other sorting sequences will be discussed hereinafter.

During block 3066 of the flow, representations of the textual blocks in the data base are output by score starting with the highest score. To this end the textual data base depicted at block 3068 of FIG. 3 contains representations of a textual data base such as that depicted in Table 3. Each textual block identifier is a pointer used to locate the corresponding document and paragraph in the textual data base and to provide representations of the actual text in the documents and paragraphs back to the user via the CRT 1102B on the control unit 1102.

FIG. 4 is a generalized block diagram of a digital data processing means for carrying out a portion of the operation depicted by the flow of FIG. 2. A variant set memory 3070 is provided for storing a set of equivalent entry words (candidate words) for each of the query words. The memory 3070 may store representations of the equivalent entry words in a number of different forms. For example, the variant set memory may store coded characters representing the actual equivalent entry words. Preferably, however, the variant set memory stores representations of the equivalent entry words, where the representations are address pointers or the like, which are used to locate information about each of the equivalent entry words. In the latter case, the values are stored which provide information to locate the location in a stored table of textual block identifiers which contain corresponding textual block identifiers giving all textual blocks where the corresponding equivalent word is located.

A memory 3072 is depicted for storing a table of textual block identifiers arranged by equivalent words. The table may be organized in a number of different ways. Preferably, however, the memory is selectable using the equivalent words. For example, each equivalent entry word is assigned a value (i.e., one of the values contained in the variant set memory 3070), and the value corresponds to a storage location in the memory. Each storage location contains each of the textual block identifiers for the corresponding equivalent word. Thus, each of the locations in the memory 3072 contains a group of textual block identifiers, each group corresponding to a different equivalent entry word in the stored data base as generally illustrated in Table 4.

Selection circuit 3074 utilizes the representations of each equivalent entry word in each set contained in memory 3070 to obtain the corresponding group of textual block identifiers from the memory 3072. The selection circuit may be organized in a number of different ways. For example, if representations stored in the variant set memory 3070 are representations of the actual equivalent entry words and the table in memory 3072 contains representations of the actual entry words of the data base followed by the corresponding group of textual block identifiers, then selection circuit 3074 may be arranged as a comparator to compare the equivalent entry words with the entry words in the table of memory 3072 for a match. When a match, is found the corresponding textual block identifiers are read out from the corresponding memory location.

However, in the preferred embodiment the values stored in memory 3070 are used as address pointers or identifiers into the table of memory 3072 to thereby (directly or indirectly) locate and read out the corresponding textual block identifiers.

A textual block identifier and score memory 3076 is provided. Memory 3076 stores each of the textual block identifiers obtained from the table in memory 3072. The textual block identifiers are preferably stored in sets, one set for each equivalent entry word, and each set contains all of the textual block identifiers for the corresponding equivalent entry word. A merge paragraph identifier and increment scores circuit 3078 merges the textual block identifiers from each of the different sets and stores them into memory 3076 so that one list of textual block identifiers is formed without duplication. Corresponding to each textual block identifier, a score or count is formed indicating the number of times that the textual block identifier occurred in each different set.

Preferably, a sorter 3080 sorts the merged textual block identifiers in descending value order by score.

In summary then, there has been disclosed a method using a digital data processing means and stored representations of a table of textual block identifiers for locating in a stored textual data base those textual blocks having the best match with a query. The data base has representations of words grouped into the textual blocks. The textual blocks by way of example are paragraphs, or paragraphs within documents. The representations of individual textual block identifiers are selectable from the table in groups, each group corresponding to a different word in the stored data base. Each textual block identifier in the representations in each group of textual block identifiers provides an indication of a textual block in the stored data base which contains the corresponding word.

The method includes the following steps. A query word is received having representations of a plurality of words to be located in textual blocks contained in the stored data base. For each of a plurality of the query words, a corresponding set of equivalent words which are contained in the stored, data base is determined. Each set of equivalent words is equivalent to the corresponding query word. Each equivalent word has a corresponding group of textual block identifiers represented in the stored table. The method also includes the step of processing representations of the textual block identifiers in those groups which correspond to the determined equivalent words to thereby form a score for at least one textual block. The score provides an indication of the total number of the sets which have at least one equivalent word in the at least one textual block.

Finally the score is used to provide output data pertaining to selected textual blocks in the stored textual data base. Preferably the textual block indicators are sorted in a descending order according to score and representations of the corresponding blocks of the data base corresponding to each textual block identifier are read out and output on the CRT of the operator console.

B. DETAILED DESCRIPTION OF METHOD AND MEANS OF FIGS. 1 AND 5

FIG. 5 (FIGS. 5A–5D) is a flow diagram depicting the sequence of operation of the system of FIG. 1 while executing the QDPCMD program which causes the scoring of the paragraphs of the data base depending on the representations of the equivalent words previously formed.

The method and means involved employ certain buffers. The names of these buffers and a description of the purpose of each are set forth in Table 1. Representations of the buffers listed and described in Table 1 are contained in the random access memory (RAM) 1104. FIG. 6 is a block diagram illustrating the various buffers listed in Table 1. Buffers 120, 122, 124, 126, and 128 are the principal buffers used for processing and merging of the paragraph references and for forming the scores.

Referring to FIG. 7 the disk storage unit 1107 contains a representation of a table of paragraph references which is a part of the stored data base. This table is generally designated as 300 and by way of example is depicted as having memory locations represented by the numbers 300-1, 300-60, 300-61, 300-62, 300-80, 300-81, 300-82. Other memory locations are indicated by dashed lines. Each memory location corresponds to an equivalent word. By way of example, memory locations 300-60, -61 and -62 correspond to the equivalent words INTEREST, INTERESTING, and INTERET, whereas memory locations 300-80, -81 and -82 correspond to the equivalent words RATE, RATES, and RATING. Thus each memory location in Table 300 corresponds to a different word in the data base. Each memory location in the Table 300 contains a group of paragraph references for the corresponding data base word. By way of example, memory location 300-60 contains all the paragraph references for the data base word INTEREST. The paragraph references are the values which identify each document and paragraph where the corresponding word is located. By way of example the memory location 300-60 corresponding to the data base word INTEREST contains the paragraph references 2, 4, 12, 20, 28 and 31. It will be recognized that these are the same paragraph references (textual block identifiers) for the word INTEREST depicted in Table 6. With reference to Table 3, these paragraph references correspond to the paragraph references shown along the left side of the table and identify the document and paragraph numbers where the corresponding word is found in the textual data base.

Representations of the actual text in the data base are stored in a special memory area of the disk unit 1107 depicted at 400 in FIG. 6. Each of the paragraphs of the stored textual data base 400 is accessible using a different one of the paragraph references in the table of paragraph references 300. The stored textual data base 400 of FIG. 6 is represented having memory locations corresponding to paragraph references 1, 2 through Z where Z is the last paragraph of data base, the missing paragraphs of data base being indicated by dashed lines.

Referring to FIG. 5, the PACKAGES (RESULTS) BUFFER 130 is depicted as having two packages, namely, package (PKG) 1 and package (PKG) 2. As discussed above, the digital data processing means of FIG. 1A is operative for receiving a query from the operator terminal 1102 composed of one or more query words and then for each query word forming a set of equivalent words which are acceptable misspellings and acceptable inflections of the corresponding query word. Other equivalent words such as synonyms may also be included in the equivalent words as will be evident to those skilled in the art.

Each package corresponds to a different significant query word and contains packets corresponding to each of the equivalend words. A packet is a set of digital data representations which are used by the digital data processing system to locate and access the corresponding location in the table of paragraph references 300 (FIG. 7). The representations contained in each packet, for example, may be an indirect address which identifies the memory location in Table 300 with reference to the beginning of the table stored in disk storage unit 1107 or it may be the actual address. Other coding schemes for locating each memory location in Table 300 will be evident to those skilled in the art.

Referring specifically to FIG. 6 by way of example, package PKG 1 contains representations which are generally designated by the numbers 300-60, 300-61 and 300-62 corresponding to memory locations identified by the same numbers in FIG. 7. Memory locations containing the values 300-60, 300-61 and 300-62 are packets identified as P1, P2 and P3 of package PKG 1. Similarly package PKG 2 contains packets 300-80, 300-81 and 300-82 which are references to the correspondingly numbered locations in the table of paragraph references 300 (FIG. 7). The packets 300-80, 300-81 and 300-82 are packets P1, P2 and P3 of package PKG 2. By way of example, FIG. 6 shows packages PKG 1, PKG 2 through PKG X although only packages PKG 1 and PKG 2 will be utilized in the example provided herein. Also by way of example each of the packages is depicted as having locations for storage of packets P1 through PY although only the first three packets of packages PKG 1 and PKG 2 are shown and used by way of example. Although the packages are shown having the same number of packets and locations for storing the packets, it will be understood that the number of packets may vary between packages.

The QUERY COMMUNICATION BUFFER 132 is contained in RAM 1104 and stores certain variables used in the system as follows. Location 220 stores PACKAGES_COUNT, the number of packages for a given query. Memory locations 224 of the QUERY COMMUNICATION BUFFER 132 contain PACKAGES_SIZE, an array of locations in memory. Each memory location contains representations of the number of packets within one of the packages in the PACKAGES BUFFER 130. The size of the array of memory locations 224 is the maximum number of significant words that a user's query may contain and therefore the maximum number of packages that may be contained in the PACKAGES BUFFER 130. By way of example, the PACKAGES_SIZE array 224 has locations represented as 224-1 through 224-X corresponding to packages PKG 1, PKG 2 . . . PKG X.

Memory location 226 of the QUERY COMMUNICATION BUFFER 132 contains PACKAGES_BUFFER_LOCATION, the address of the beginning of the PACKAGES BUFFER 130. Memory location 228 contains the MATCH ENTRIES, the number of entries in the MATCH BUFFER -124 following the completion of the score merge process. Upon exit from the QDPCMD program, location 228 contains MATCH_COUNT, the number of paragraphs within the data base that contain one or more occurrences of any acceptable misspellings and acceptable inflections of any significant query words (including an exact match of the significant query word). Memory location 230 contains MATCH_BUFFER_LOCATION, the address of the beginning of the MATCH BUFFER 124.

The VARIABLES BUFFER 134 contains the remaining variables depicted in Table 2, namely, variables 232-252.

The flow diagram of FIG. 5 is depicted as having blocks labeled F1 through F32. Each block contains a brief description indicating the operation which is performed by the digital data processing system of FIG. 1 corresponding to that block.

Assume now that the PACKAGES BUFFER 130 has been loaded with the reference values represented in packages PKG 1 and PKG 2 of FIG. 6, that the table of paragraph references in the data base 300 contains those values at 300-60, -61, -62, -80, -81 and -82 depicted in FIG. 7, that the stored textual data base 400 depicted in FIG. 7 contains the example of the textual data base depicted in Table 3. Also assume that the significant query words are INTEREST and RATE and that the PACKAGES BUFFER 130 contains the packets 300-60, -61, -62, and -80, -81 and -82 corresponding to the equivalent entry words INTEREST, INTERSTING, INTEREST, RATE, RATES, and RATING, respectively.

Referring now to the flow diagram of FIG. 5A and FIGS. 6 and 7, the operation commences at block F1 when the QDPCMD program is called. During block F2 the PACKAGES_COUNT, the PACKAGES_SIZE ARRAY, and the PACKAGES_BUFFER_LOCATION are stored into locations 220, 224 and 226 of the query communication buffer 132. During block F3 a programming procedure allocates the following buffers: the REFERENCE GATHER BUFFER 120, the SINGLE PACKAGE MERGE OUTPUT BUFFER 122, the MATCH BUFFER 124, the SINGLE PACKAGE MERGE TABLE 126, and the SCORE MERGE TABLE 128. Additionally the MATCH_BUFFER_LOCATION value is stored into location 230 and therefore contains the address of the beginning of the MATCH BUFFER.

During block F4 the MATCH COUNT value in location 128 is set to zero. With reference to Table 2 the MATCH COUNT will finally be a value representing the number of match entries that are in the match buffer following the completion of the score merge process.

During block F5 the PACKAGE_POINTER in location 232 is set to the location of the first package in the PACKAGES BUFFER 130. For example the first location containing the representation 300-60 has a location of zero and this value is now contained in PACKAGE_POINTER 231. Additionally the value in PACKAGE_NUMBER 232 is set to 1 corresponding to package PKG 1. PACKAGE_POINTER 231 and PACKAGE_NUMBER 232 provide information to the digital data processing system as to where to go in RAM 1104 to access the beginning of the current package being processed.

During flow block F6 SCORE_MERGE_TABLE_ENTRY_POINTER 240 is set to the beginning location of the SCORE MERGE TABLE BUFFER 128 and SCORE_MERGE_TABLE_ENTRIES 242 (variables buffer 134, FIG. 6) is set to zero. Therefore, at this point the representations are available to the digital data processing system indicating the next location in the MERGE TABLE 128 to build an entry (which to be explained consists of the location and size of the package reference set within the SINGLE PACKAGE MERGE OUTPUT BUFFER 122).

During block F7 SINGLE_PKG_MERGE_STORE_POINTER 252 is set so that it indicates the beginning location of the SINGLE PACKAGE MERGE OUTPUT BUFFER 122. This is the location at the beginning of the SINGLE PACKAGE MERGE OUTPUT BUFFER where the first paragraph identifiers from the REFERENCE GATHER BUFFER will be stored as a result of a single package merge.

Following block F7, block F8 is entered where a check is made to determine whether the digital data processing system is finished going through all of the packages in the PACKAGES BUFFER 130. To be explained in more detail, the system is finished when it has completed gathering the paragraph references for every packet within all packages. To this end the determination is made as to whether the system is finished by comparing PACKAGE_NUMBER 232 with PACKAGES_COUNT 230 (buffer 134, FIG. 6). In the example being given, PACKAGE_NUMBER 232 was set to 1 in block F5 and PACKAGES_COUNT 220 (the number of packages in the query) is 2 (i.e., PKG 1 and PKG 2) and therefore the value 1 in location 232 is less than the value in 220 and therefore the NO route out of block F8 is followed to block F9. If the value in 232 was greater than the value in 220 as would occur when all the packets in all of the packages have been processed, then the YES route out of block F8 is followed to block F28.

During block F9 the computer system is initialized to where it will be storing paragraph references for a package. The initialization is the beginning of the REFERENCE GATHER BUFFER 120. To this end REFERENCE_GATHER_STORE_POINTER 250 of the variables buffer 134 (FIG. 6) is set to the beginning location of the REFERENCE GATHER BUFFER 120 (FIG. 6). FIGS. 8-15 show examples of the REFERENCE GATHER BUFFER 120 as well as the other buffers 122, 124, 126, and 128 during the merging of the paragraph references contained in locations 300-60, -61, -62, -80, -81, and -82 in the table of paragraph references 300 (FIG. 7) contained in the disk storage unit 1107. By way of example the value of the REFERENCE_GATHER_STORE_POINTER 250 is represented by the symbol A1 in FIG. 8 and as indicated in that figure, points to the beginning of the REFERENCE GATHER BUFFER 120.

During block F10 the SINGLE_PKG_MERGE_TABLE_ENTRY_POINTER 246 is set to the beginning location of the SINGLE PACKAGE MERGE TABLE BUFFER 126. This value is depicted by the symbol G1 in FIG. 8. Additionally SINGLE_PKG_MERGE_TABLE_ENTRIES 248 is set to zero. Thus at this point the value in location 246 points to the beginning of the SINGLE PACKAGE MERGE TABLE BUFFER 126 and SINGLE_PKG_MERGE_TABLE_ENTRIES 248 is zero signifying that there are zero entries in the SINGLE PACKAGE MERGE TABLE BUFFER 126 at this time.

During block F11 PACKET_NUMBER 236 is set to 1 thus indicating that the first packet in the PACKAGES BUFFER 130 is being processed. Additionally the PACKET_POINTER 234 is set to a value indicating the location of the first packet (designated as P1 in FIG. 6) in the current package (i.e., PKG 1) which is now pointed to by PACKAGE_POINTER 131. Additionally during block F11 PACKET_COUNT 238 is initialized to the number of packets within the current package. With reference to the example of FIG. 6, there are Y packets in the current package PKG 1. To this end the digital data processing system accesses the PACKAGE SIZE ARRAY 224 using the current PACKAGE_NUMBER 232 which at this point in time is a 1. As a result location 224-1 of the PACKAGE SIZE ARRAY 224 (FIG. 6) is accessed and the value 3 is read out therefrom and stored as the PACKET_COUNT 238. The value 3 in location 224-1 is the number of packets contained in the first package PKG 1 of the PACKAGES BUFFER 130 and this value is now contained in the PACKAGE_COUNT location 238

Following block F11, block F12 is entered. Flow block F12 is a loop control where the digital data processing system determines if it is finished accessing the references for the number of packets in the current package. PACKET_NUMBER 236 the first time through will be a 1 whereas PACKET_COUNT 238 is a 3. Therefore the former is clearly larger than the latter and the NO route out of block F12 is taken to flow block F13.

During flow block F13 the digital data processing system calls a data base routine (not shown) that returns all paragraph references that are pointed to by the reference which is contained in the packet pointed to by PACKET_POINTER 234. Thus the system goes to the location in RAM 1104 which is pointed to by PACKET_POINTER 234. In the example being given, this is the first packet P1 in PKG 1 of the PACKAGES BUFFER 130 and contains reference 300-80. With reference to the table of paragraph references 300 depicted in the disk storage unit 1107 of FIG. 7, the corresponding location contains the paragraph references 3, 4, and 12 for the word RATE. Accordingly the digital data processing system obtains the paragraph references 3, 4 and 12 from the table of paragraph references 300 and returns them in increasing value order, storing them in that same order in the REFERENCE GATHER BUFFER 120 as depicted in FIG. 8. The paragraph references are stored in the REFERENCE GATHER BUFFER 120 beginning at the location pointed to by the REFERENCE_GATHER_STORE_POINTER 250 which by way of example in FIG. 8 is depicted as A1. Additionally during block F13 REFERENCES_RETURNED 254 is set to the number of paragraph references stored in the REFERENCE GATHER BUFFER 120 which number in this case is 3. In summary then during flow block F13 the digital data processing system obtains the paragraph references for one packet within the current package (PKG 1) of the PACKAGES BUFFER 130 (FIG. 6) which is being processed.

Following flow block F13, flow block F14 is entered where a check is made to see if the data processing system returned any paragraph references, i.e., obtained any paragraph references from the table of paragraph references 300 (FIG. 7). To this end during the preceding block F13, REFERENCES_RETURNED 254 was set to 3 and therefore is greater than zero and accordingly the YES route out of block F14 is followed to block F15.

Accordingly in the example, three paragraph references have been obtained and stored in the REFERENCE GATHER BUFFER 120. During flow block F15 an entry is made in the SINGLE PACKAGE MERGE TABLE BUFFER 126 at the location specified by the SINGLE_PKG_MERGE_TABLE_ENTRY_POINTER 246 which by way of example is depicted as G1 (FIG. 8). An entry in buffer 120 consists of the beginning location of the paragraph references just returned, i.e., the value REFERENCE_GATHER_STORE_POINTER 250 and the number of paragraph references returned, i.e., the value REFE- RENCES_RETURNED 254. By way of example, the SINGLE PACKAGE MERGE TABLE BUFFER 126 now contains the address A1 followed by the value 3 in address G1.

Block F16 of the flow is now entered. During block F16, SINGLE_PKG_MERGE_TABLE_ENTRIES 248 is incremented by 1 to indicate that the SINGLE PACKAGE MERGE TABLE BUFFER 126 now contains one entry.

Block F17 of the flow is now entered where the SINGLE_PKG_MERGE_TABLE_ENTRY_POINTER 252 is adjusted so that it now points to the next position within the SINGLE PACKAGE MERGE TABLE BUFFER 126 for the next subsequent entry. The value in 246 is depicted by way of example in FIG. 8 as G2.

During block F18 the system updates the location pointed to by REFERENCE_GATHER_STORE_POINTER 250 so that it now points at the location in the REFERENCE GATHER BUFFER 120 (FIG. 8) following the last paragraph reference stored there in preparation for a possible next call to the data base for a packet in the current package. The value in 250 is depicted by way of example as B1 in FIG. 8. By way of example the value B1 may be determined by adding the size of the paragraph references placed in buffer 120 to the value A1. Alternately the value A1 could be incremented for each paragraph reference placed into buffer 120 until the value B1 is reached.

Block F19 of the flow is entered either following block F18 or following block F14. The entry from block F14 is entered if REFERENCES_RETURNED 254 is not greater than zero and the NO route out of block F14 is taken. During block F19 PACKET_NUMBER 236 is incremented by 1 so it contains the number of the packet depicted containing the representation 300-81 in the packages buffer 130 (FIG. 6). Thus the digital data processing system is now prepared to gather the references for the next packet.

During block F20 PACKET_POINTER 234 is set equal to the location of the possible packet within the current package that follows the packet currently being pointed at by PACKET_POINTER 234. Thus PACKET_POINTER 234 now contains the address within a package of the packet currently being processed which, by way of example, is the packet containing representation 300-81 in FIG. 6.

Following block F20 the digital data processing system returns to block F12 via circle 1B where the system checks to see whether it has finished with the last packet in the package. In the example being given PACKET_NUMBER 236 is now 2 (one of the three packets having been processed). Also PACKET_NUMBER 236 is not larger than PACKET_COUNT 238 since PACKET_COUNT 238 now contains the value 3 and accordingly block F13 is again entered where the paragraph references corresponding to packet 2 of package PKG 1 are added to the REFERENCE GATHER BUFFER 120 beginning at location B1 (FIG. 8).

Referring to FIGS. 5 and 6, the packet P2 of PKG 1 contains representation 300-81 and points to the location in the table of paragraph references 300 for the entry word RATES which contains the paragraph references 1, 2, 4, 9, 10, and 20. Accordingly these paragraph references are added to the REFERENCE GATHER BUFFER 120 resulting in the condition depicted in the REFERENCE GATHER BUFFER 120 in FIG. 9. Additionally REFERENCES_RETURNED 254 is set to 6 corresponding to the number of paragraph references stored in the REFERENCE GATHER BUFFER 120.

Blocks F14-18 are reentered thereby causing REFERENCE_GATHER_STORE_POINTER 250 to be set so that it points to the next available location after the paragraph references were added to the REFERENCE GATHER BUFFER 120, and the SINGLE PACKAGE MERGE TABLE BUFFER 126 is loaded with a new entry, namely the pointer for the beginning of the newly added entry references, pointer B1, and with a value representing the number of entry references added to the buffer 120, number 6. The values B1 and 6 are added at the location pointed to by G2 in SINGLE_PKG_MERGE_STORE_POINTER 252. The pointer 252 is then incremented so that it now points to location G3 which is the next available location in the SINGLE PACKAGE MERGE TABLE BUFFER 126. Thus at this point the SINGLE_PKG_MERGE_STORE_POINTER 252 is pointing to the next available location (i.e., G3) in the SINGLE PACKAGE MERGE TABLE BUFFER 126 and REFERENCE_GATHER_STORE_POINTER 250 points to the next available location (i.e., C1) in the REFERENCE GATHER BUFFER 120.

Following block F18, blocks F19 and 20 are reentered where PACKET_NUMBER 236 is incremented by 1 so that it now indicates that packet 3 is to be processed. During block F20 PACKET_POINTER 234 is set so that it points to the address of the location of the possible packet within the current package that follows the packet currently pointed at by the PACKET_POINTER 234. The pointer 234 is therefore now pointing to the packet P3 containing the representation 300-82 in package PKG 1 which, with reference to FIG. 7, corresponds to the paragraph references for the entry word RATING.

Flow blocks F12 and F13 are reentered after F20 where the third packet P3 in PKG 1 corresponding to the word RATING is processed in the manner discussed above. Thus as indicated in FIG. 10 the four paragraph references 6, 7, 15 and 17 at 300-82 of the table of paragraph references 300 (FIG. 7) are read out and added to the REFERENCE GATHER BUFFER 120 beginning with the location C1 pointed to by REFERENCE_GATHER_STORE_POINTER 250. Additionally, REFERENCE_GATHER_STORE_POINTER 250 is incremented to the next available location (D1) after the last paragraph reference. However since this is the last packet of PKG 1, the pointer in 250 will not be used because the system will have generated all of the references for package PKG 1. Additionally PACKET_POINTER 234 will be set to the address of the possible packet (P4) within the current package PKG 1 that follows current packet P3. However this also is not used. Additionally the PACKET_NUMBER 236 is incremented during block F19 so that it now contains a value 4.

Following F20, block F12 is again entered. At this point the PACKET_NUMBER 236 contains a 4 which is greater than the value 3 contained in PACKET_COUNT 238. Accordingly the YES route out of block F12 is taken via circle 3A to block F21.

Block F21 is entered when the system has generated all of the package references for the current package (in this example, PKG 1) and a check is now made to see if any references have been generated for the current package. To this end during block F21 the SIN- GLE_PKG_MERGE_TABLE_ENTRIES 248 is checked to see whether it is greater than zero. At this point 248 contains a value of 3 indicating that there are three sets of paragraph references contained in the REFERENCE GATHER BUFFER 120 and three entries in the SINGLE PACKAGE MERGE TABLE BUFFER 126. Accordingly the YES route is taken out of block F21 to block F22.

During block F22 of the flow a single package merge is performed of all three paragraph reference lists that are in REFERENCE GATHER BUFFER 120 resulting in the content of SINGLE PACKAGE MERGE OUTPUT BUFFER 122 depicted in FIG. 11. The single package merge operation in effect creates a new list of paragraph references from the lists of paragraph references from one package (i.e., PKG 1) contained in the REFERENCE GATHER BUFFER 120, eliminating all duplicates and in addition ordering the paragraph references by increasing paragraph reference value. By way of example, the REFERENCE GATHER BUFFER 120 contains two 4's whereas in the SINGLE PACKAGE MERGE OUTPUT BUFFER 122 only a single paragraph reference of 4 is contained in the list. The new list in the SINGLE PACKAGE MERGE OUTPUT BUFFER 122 is called the "package reference set" for the current package (PKG 1) and is stored in the SINGLE PACKAGE MERGE OUTPUT BUFFER 122 beginning at the location E1 indicated by SINGLE_PKG_MERGE_STORE_POINTER 252 which is indicated in FIG. 11. Stating it differently, the package reference set for PKG 1 contained in buffer 122 has a list of unique paragraph references that occur within any of the three lists of paragraph references contained in the REFERENCE GATHER BUFFER 120.

Following block F22, block F23 is entered where the digital data processing system creates a score merge table entry in the SCORE MERGE TABLE BUFFER 128 in much the same fashion as entries were created in the SINGLE PACKAGE MERGE TABLE BUFFER 126. At this point the SCORE_MERGE_TABLE_ENTRY_POINTER 240 contains the address within the SCORE MERGE TABLE BUFFER 128 of the next location where an entry can be stored. The address is depicted in FIG. 11 by the symbol H1. Each location in the SCORE MERGE TABLE BUFFER 128 stores an entry which consists of the location within the SINGLE PACKAGE MERGE OUTPUT BUFFER 122 where the results of the single package merge (namely, the package reference set) begin. This beginning is of course the content of the SINGLE_PKG_MERGE_STORE_POINTER 252 which as indicated in FIG. 11 now contains an address represented by the symbol E1. The entry in the buffer 128 also includes the number of paragraph references which were just stored in the package reference set just stored in buffer 122. In this particular case there are twelve paragraph references in the package reference set in buffer 122. Accordingly the first entry at address H1 of the SCORE MERGE TABLE BUFFER 128 consists of representations of the address E1 and the number 12 (see FIG. 11).

During block F24 the SCORE_MERGE_TABLE_ENTRY_POINTER 240 is then set to the next entry location within the SCORE MERGE TABLE BUFFER 128 which as indicated in FIG. 11 is an address represented by the symbol H2. Additionally SCORE_MERGE_TABLE_ENTRIES 242 is incremented by 1. The value in 242 was originally zero and now contains a 1 and therefore contains the number of score merge table entries that had been stored in the SCORE MERGE TABLE BUFFER 128 and hence the number of package reference sets that exist at this point within the SINGLE PACKAGE MERGE OUTPUT BUFFER 122.

During flow block F25 the SINGLE_PKG_MERGE_STORE_POINTER 252 is then set to the address of the location in the SINGLE PACKAGE MERGE OUTPUT BUFFER 122 which follows the last paragraph reference presently stored in that buffer. By way of example, this address is depicted by the symbol E2 in FIG. 11 which is the address of the location following the paragraph reference 20. This then will become the beginning location for the storage of the package reference set for PKG 2.

During block F26 the PACKAGE_NUMBER in location 232 is incremented by 1 so that it now contains a 2 which is the number of the package currently being processed (i.e., PKG 2) during the paragraph reference gathering process. It should be noted that the values in PACKAGE_NUMBER 232 can range from 1 up to the contents of PACKAGES_COUNT 220.

During block F27 PACKAGE_POINTER 231 is set to the beginning location in the PACKAGES BUFFER 130 of the next possible package which in this case is package PKG 2. With reference to FIGS. 5 and 6 the address in PACKAGE_NUMBER 232 will then be the beginning address of package PKG 2 containing the representations 300-60, 61 and 62 for the entry words INTEREST, INTERESTING, and INTERET. Following block F27 the system now returns via circle 1A to block F8.

If during block F8 it is found that PACKAGE_NUMBER 232 is greater than PACKAGES_COUNT 220, it would mean that there are no packages left to process and accordingly the YES route would be taken out of block F8 via circle 4A to flow block F28. However in the example being given both PACKAGE_NUMBER 232 and PACKAGES_COUNT 220 are a 2 and therefore the NO route is taken out of block F8 to block F9 in the manner discussed above, with respect to the first package.

During block F9 the REFERENCE_GATHER_STORE_POINTER 250 is set to the beginning location of the REFERENCE GATHER BUFFER 120 where the paragraph references for the first packet of package PKG 2 are to be stored. By way of example, this is an address depicted by the symbol A2 in FIG. 12. During block F10 the SINGLE_PKG_MERGE_TABLE_ENTRY_POINTER 246 is set to the beginning location of the SINGLE PACKAGE MERGE TABLE BUFFER 126. Also since this is a new package the number of entries represented by SINGLE_PKG_MERGE_TABLE_ENTRIES 248 is reset to zero. During block F11 the PACKET_NUMBER 236 is set to 1 indicating that the first packet in package PKG 2 is currently being processed. Additionally PACKET_POINTER 234 is set to the address of the location of the first package in PKG 2. Additionally, PACKET_COUNT 238 is set to the package size, contained in the package size array location 224-2 (FIG. 6). To this end the location in the package size array 224 indicated by the value PACKAGE_NUMBER 232 is accessed and the value 3 is read out and stored into location 238.

During F12 the 1 in PACKET_NUMBER 236 is compared with the value 3 in PACKET_COUNT 238 and is found to be smaller and accordingly the NO route to block F13 is taken.

During F13 packet representation 300-60 is used to locate and read out the paragraph references for the word RATES from the table of paragraph references 300 (FIG. 7) and the paragraph references are stored into REFERENCE GATHER BUFFER 120 in increasing value order beginning with the address A2, now contained in REFERENCE_GATHER_STORE_POINTER 250. With reference to FIG. 7 it will be noted that the location in the table of paragraph references 300 corresponding to the address 300-60 is for INTEREST and accordingly the paragraph references 2, 4, 12, 20, 28 and 31 are stored in the REFERENCE GATHER BUFFER 120 as depicted in FIG. 12.

At least some references have been returned from the table of paragraph references and accordingly blocks F14 and F15 are entered in sequence.

During F15 a single package merge table entry is formed at the location within the single package merge table buffer now pointed to by the SINGLE_PKG_MERGE_TABLE_ENTRY_POINTER 246. The location is represented by the address G4 and at this location the beginning address A2 of the entry in the buffer 120 along with the number of entries, namely, 6, are stored in the buffer 126 as depicted in FIG. 12. During block F19 and block F20 the PACKET_NUMBER 236 and the PACKET_POINTER 234 are adjusted so that they now correspond to the next packet P2 in package PKG 2 and blocks F8 through F20 are repeated. The subsequent operation during blocks F8-F20 is generally along the lines discussed above and will readily be understood with reference to the notations in the blocks and the previous discussions and examples for these blocks. However the result of the operation is as generally depicted in FIG. 13. As depicted the paragraph references for the second packet containing representation 300-61 are utilized to read out the corresponding entry in the table of paragraph references 300 which contains the paragraph references for the entry INTERESTING. Accordingly the paragraph references 6, 40, 45, and 58 are now stored in the REFERENCE GATHER BUFFER 120 beginning at the address B2 now contained in REFERENCE_GATHER_STORE_POINTER 250. Additionally the address of the beginning of these entries, namely, address B2, and the number of entries, namely, 4, are stored in the address G5 of the SINGLE PACKAGE MERGE TABLE BUFFER 126, the address G2 now being stored in the SINGLE_PKG_MERGE_TABLE_ENTRY_POINTER 246.

Figure 14:
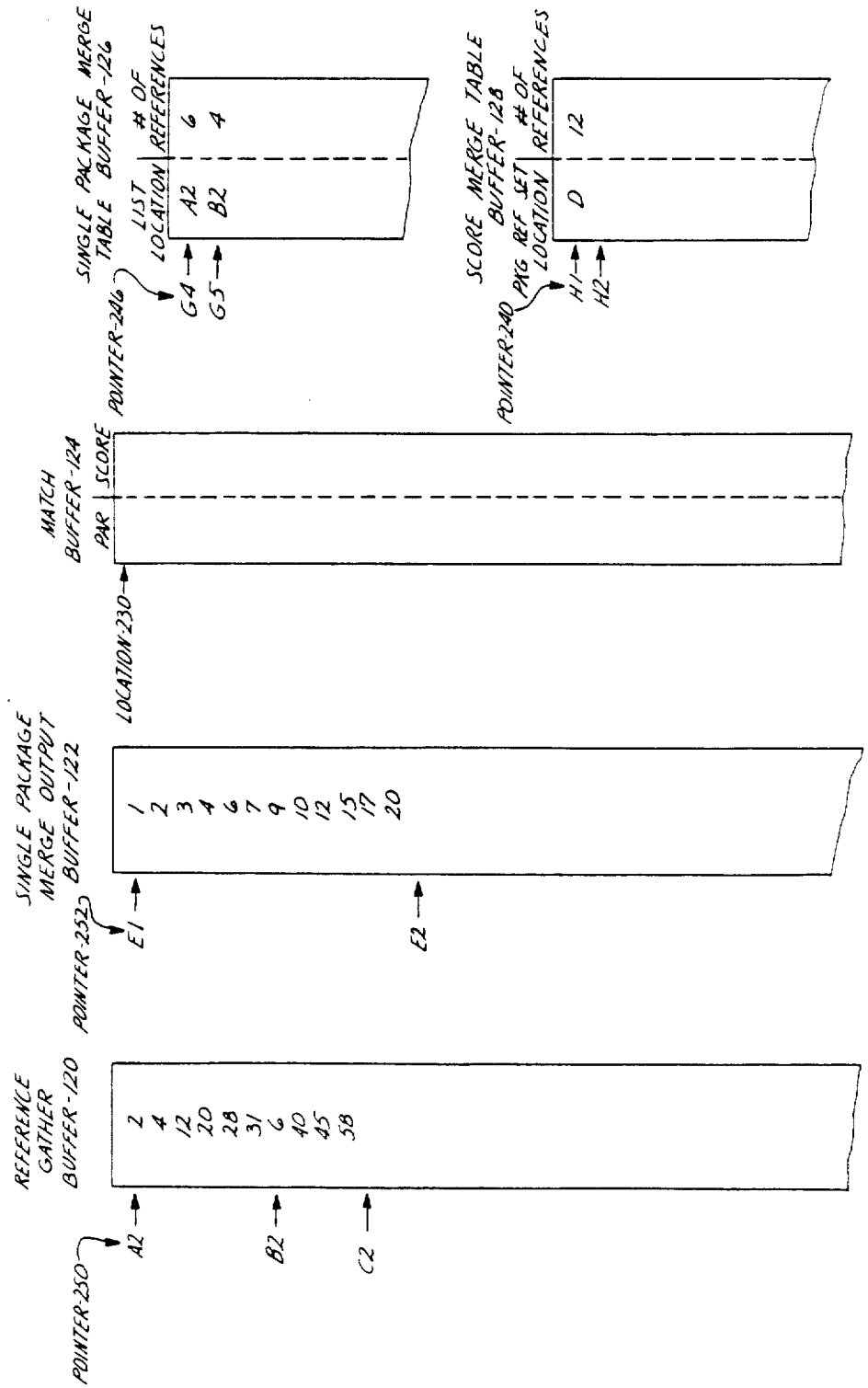

Blocks F8 through F20 are then repeated a further time. This time the PACKET_NUMBER 236 is 3 and the PACKET_POINTER 234 contains the address of the third packet P3 in PKG 2 of the packages buffer 130. The third packet contains representation 300-62. Accordingly wth reference to the table of paragraph references 300 (FIG. 7) the paragraph reference 9 corresponding to the entry word interest is read out and stored in the REFERENCE GATHER BUFFER 120. Referring to FIG. 14 the REFERENCE_GATHER_STORE_POINTER 250 now contains the address C2 and accordingly the paragraph reference 9 is stored at address C2. Additionally the address of the current entry, namely, address C2, and the number of references in the current entry, namely, 1, are stored at address G6 of the SINGLE PACKAGE MERGE TABLE BUFFER 126, again as depicted in FIG. 14.

At this point the system would have gone through all of the packages for one complete set of significant query words (in the example the significant query words are RATES and INTEREST). Blocks F8 through F12 are reentered. This time the number in PACKET_NUMBER 236 would have been incremented to 4 and therefore would be larger than the value 3 in PACKET_COUNT 238. Accordingly the YES route out of F12 would be taken to blocks F21 and F22. Since some entries have been placed into the REFERENCE GATHER BUFFER 120, the YES route would have been taken out of block F21 to block F22. During block F22 the digital data processing system will create a unique list of the paragraph references from those paragraph references contained in the REFERENCE GATHER BUFFER 120. This unique list called a "package of references" for package PKG 2 will be formed beginning at address E2 in the SINGLE PACKAGE MERGE OUTPUT BUFFER 122. Address E2 is now contained in SINGLE_PKG_MERGE_STORE_POINTER 252. This condition is depicted in FIG. 15.

In summary then up to this point the digital data processing system has gone through every single package in packages buffer 130, generating a package reference set in buffer 122 for each package in the packages buffer 130. In the example given there are two packages. However it will be understood that there could be any number of packages and any number of packets within each package within the memory limitations of the system.

Following block F22, blocks F23 through F27 are again entered where the next entry in the SCORE MERGE TABLE BUFFER 128 is entered. In this regard a score merge table entry is formed at the location within the SCORE MERGE TABLE BUFFER 128 which is pointed to by the SCORE_MERGE_TABLE_ENTRY_POINTER 240. At this point the pointer 240 contains, by way of example, address H2. Accordingly the address E2 contained in the SINGLE_PKG_MERGE_STORE_POINTER 252 and the value 11 which is the number of paragraph references in the package reference set for PKG 2 are stored at location H2 in the SCORE MERGE TABLE BUFFER 128.

During block F26 the PACKAGE_NUMBER 232 is incremented by 1 and therefore is now 3, i.e., one higher than the number of packages in the PACKAGES BUFFER 130 (FIG. 6). Accordingly following block F27, block F8 is reentered where it is found that the PACKAGE_NUMBER 232 is larger than the value in PACKAGES_COUNT 220 and accordingly the YES route is taken out of block F8 to block F28 via circle F4. During the operation of blocks F28 through F32 the package reference sets in the SINGLE PACKAGE MERGE OUTPUT BUFFER 122 are merged into a unique set of paragraph references. In addition each paragraph reference is scored by storing in association with that paragraph reference the number of times the paragraph reference occurs in different package reference sets in the SINGLE PACKAGE MERGE OUTPUT BUFFER 122. Consider now the operation.

During block F28 SCORE_MERGE_TABLE_ENTRIES 242 is checked to see whether it is greater than zero. It will always be greater than zero if there are any package references within the SINGLE PACKAGE MERGE OUTPUT BUFFER 122 which are to be merged into the MATCH BUFFER 124. In this example the comparison finds that the value in 242 is greater than zero and accordingly the YES route is taken to block F29. The operation during block F29 is similar to the operation during block F15 in that it generates a unique list of all the paragraph references encountered within the different package reference sets in the SINGLE PACKAGE MERGE OUTPUT BUFFER 122.

The unique list creates a list of all the package references values that are contained in the SINGLE PACKAGE MERGE OUTPUT BUFFER 122, eliminating all duplicate paragraph references. The operation during block F29 differs from block F15 in that during the merge process, the digital data processing system computes a score which is a count of the number of package reference sets that contain the same paragraph references. The number of times a particular paragraph reference occurs in different package reference sets becomes the score which is then stored in association with the corresponding paragraph reference in the MATCH BUFFER 124. The list of paragraph references and scores are called the "match set" for the user's query. The match set is stored in the MATCH BUFFER 124 starting at the beginning of buffer 124.

Referring to FIG. 16, MATCH BUFFER 124 now contains the match list for the package reference sets contained in the SINGLE PACKAGE MERGE OUTPUT BUFFER 122. It will further be noted that the digital data processing system orders the paragraph references in increasing value order. The content of MATCH BUFFER 124 is identical to the example of Table 5.

Returning now to the flow diagram of FIG. 3, after the match sets have been stored in the MATCH BUFFER 124, the digital data processing system will sort the paragraph references by score, providing those paragraph references with the best score first and those with lower scores later in the list. In the example there are only two different values of scores, namely, 1 and 2, but it will be understood that in an actual system there are likely to be many different scores. The scores will be sorted in descending value order with the highest score first and the lowest score last, the paragraph references being stored in association with the corresponding scores. This action is depicted at block 3064. The result of the sort by score may be that depicted by way of example in Table 6.

It will be understood that other types of sort may be performed. For example, preferably the paragraph references are broken down into document numbers and paragraph numbers and a sort is performed by score, providing a list of documents wherein the scores for the documents are listed in descending value order. Then within each document the paragraphs are sorted by score, listing the paragraphs in descending value order by score.

After the sort operation the paragraph references are used by the digital data processing system to access the actual textual data base such as that depicted by way of example in Table 3 and at 400 in the disk storage unit 1107 (FIG. 7). The actual text within each paragraph corresponding to a particular paragraph reference is then read out and representations are displayed on the CRT of the operator console 1102 (FIG. 1).

Although an exemplary embodiment of the invention has been disclosed for purposes of illustration, it will be understood that various changes, modifications and substitutions may be incorporated into such embodiment without departing from the spirit of the invention as defined by the claims appearing hereinafter.

TABLE 1

| BUFFERS USED IN QDCMD METHOD AND MEANS | | |
|---|---|---|
| REFERENCE GATHER BUFFER | −120 | Reused in an interactive process, once for each package. Each time it is used, all of the paragraph references for all of the words represented in one package are stored within this buffer. The paragraph references are stored in the buffer iteratively, i.e., references for each word in package per iteration and in increasing numeric value. |
| SINGLE PACKAGE MERGE OUTPUT BUFFER | −122 | Contains the package reference sets generated for each package that has words that have occurrence (i.e., are in paragraph) within the data base. The package reference sets are stored in the buffer one at a time as a result of separate single package merges of groups of paragraph references in the reference gather buffer. |
| MATCH BUFFER | −124 | Contains the match entries that result from a score merge process. The score merge merges the package reference sets within the SINGLE PACKAGE MERGE OUTPUT BUFFER into a match set consisting of match entries. |
| TABLE BUFFER | −126 | Used for the construction of the SINGLE PACKAGE MERGE TABLE used by the single package merge process. The table describes the location and number of paragraph references for each word of a package within the REFERENCE GATHER BUFFER |
| SCORE MERGE TABLE BUFFER | −128 | Used for the construction of the score merge table used by the score merge process. The table describes the location and size of the package reference sets within the SINGLE PACKAGE MERGE OUTPUT BUFFER. |
| PACKAGES (RESULTS) BUFFER | −130 | Contains the packages generated by QDETWD by its iterative interaction with the QAP subsystem. This buffer's location is passed to QDPCMD by QPCNTL. [SIZE=PACKAGES. COUNT*(PACKETS/ PACKAGE)*(size of packet)] (see packages buffer location). |

TABLE 1-continued
BUFFERS USED IN QDCMD METHOD AND MEANS

| | | |
|---|---|---|
| QUERY COMMUNICATION BUFFER | −132 | Contains variables that must exist across the size of the query. The variables within this buffer are: PACKAGES COUNT −220, PACKAGE SIZE ARRAY −224, PACKAGES BUFFER LOCATION −226, MATCH COUNT −228, MATCH BUFFER LOCATION −230. |

TABLE 2
VARIABLES USED IN QDCMD METHOD AND MEANS

| | | |
|---|---|---|
| PACKAGES_COUNT | −220 | Contains the number of packages in the query. Passed to QDPCMD by QPCNTL through query communications buffer. Set by QPCNTL (= # of significant words). |
| PACKAGE_SIZE (*) | −224 | An array of items that contain the number of packets within each package. The number of packets in package PKG 1 would be accessed by PACKAGE_SIZE (1). This array is passed to QDPCMD by QPCNTL through query communication buffer. The size of this array is imposed by a particular system's resource limitations and represents the maximum number of significant words that a user's query may contain (significant query words have a one-to-one correspondence with packages). |
| PACKAGES_BUFFER_LOCATION | −226 | Contains address of beginning of packages buffer 130. Set by QDETWD when it allocates packages buffer. It is located within the query communication buffer 132. |
| PACKAGE_POINTER | −231 | Contains the address within the package buffer at the beginning location of the package currently being processed during the paragraph reference gathering process. |
| PACKAGE_NUMBER | −232 | Contains the number of the package currently being processed during the paragraph reference gathering process. Its valid range is from 1 to the contents of PACKAGES_COUNT −220. |
| PACKET_POINTER | −234 | Contains the address within a package of the packet currently being processed during the paragraph reference gathering process. |
| PACKET_NUMBER | −236 | Contains the number of the packet (in the current package) currently being processed during the paragraph reference gathering process. Its valid range is from 1 to the contents of PACKAGE_SIZE (PACKAGE_NUMBER). |
| PACKET_COUNT | −238 | Contains the number of packets within the package currently being processed during the package reference gathering process. When the package represented by PACKAGE_NUMBER is about to be processed, it is set to PACKAGE_SIZE |

TABLE 2-continued
VARIABLES USED IN QDCMD METHOD AND MEANS

| | | |
|---|---|---|
| | | (PACKAGE_NUMBER). |
| SCORE_MERGE_TABLE_ENTRY_POINTER | −240 | Contains the address within the SCORE MERGE TABLE BUFFER of the next location where a score merge table entry can be built. |
| SCORE_MERGE_TABLE_ENTRIES | −242 | Contains the number of score merge table entries that have been created. Represents the number of package reference sets that exist within the SINGLE PACKAGE MERGE OUTPUT BUFFER. |
| SINGLE_PKG_MERGE_TABLE_ENTRY_POINTER | −246 | Contains the address within the SINGLE PACKAGE MERGE TABLE BUFFER of the next location where a single package merge table entry can be built. |
| SINGLE_PKG_MERGE_TABLE_ENTRIES_ | −248 | Contains the number of single package merge table entries that have been created. Represents the number of ordered lists of paragraph references that exist within the REFERENCE GATHER BUFFER. |
| MATCH_COUNT | −228 | Contains the number of match entries that are in the match buffer following completion of the score merge process. Upon exit from QDPCMD, this represents the number of paragraphs within the data base that contain one or more occurrences of any significant word within the user's query or any of the acceptable misspellings or inflections of any of the significant words of the user's query. This variable is located in query communication buffer and is set by QDPCMD before returning to QPCNTL. |
| MATCH_BUFFER_LOCATION | −230 | Contains address of beginning of match buffer. This variable is located within query communication buffer. It is set by QDPCMD before returning to QPCNTL. |
| REFERENCE_GATHER_STORE_POINTER | −250 | Contains the address within the reference gather buffer where the paragraph references for the next word package of a package should begin being stored. |
| SINGLE_PKG_MERGE_STORE_POINTER | −252 | Contains the address the SINGLE PACKAGE MERGE OUTPUT BUFFER where the next package reference set should begin being stored. |
| REFERENCES_RETURNED | −254 | Contains the number of paragraph references returned for a word packet by the data base. A value of zero returned by the data base would indicate that a system process independent of this algorithm has removed from accessibility all paragraphs that contain the word indicated by the packet in question or the user has some means of making the data base aware of words that have no occurrences within the data base. In either case, a value of zero is handled by the algorithm for the sake |

TABLE 2-continued

VARIABLES USED IN QDCMD METHOD AND MEANS of completeness.

TABLE 3

EXAMPLE OF TEXTUAL DATA BASE

| (Textural Block Identifiers) Paragraph References | Document | Paragraph | |
|---|---|---|---|
| 1 | 1 | 1 | ... RATES OF INTEREST ON AUTOS ARE HIGH ... |
| 2 | | 2 | ... THE INTEREST IN INTEREST RATES ON AUTOS WAS NEVER HIGHER ... |
| 3 | | 3 | ... DEATH RATE IS DOWN ... |
| 4 | | 4 | ... THE RATE OF INTEREST ON AUTO LOANS IS NOT DECREASING. THE RATES FOR AUTOS SHOULD BE LOWER ... |
| — | | | |
| 6 | | 6 | ... INTERESTING THAT RATING IS DIFFICULT ... |
| 7 | | 7 | ... RATING SMOG IS EASY ... |
| — | | — | |
| 9 | | 9 | ... HIGH INTEREST RATES SLOW AUTO SALES ... |
| 10 | 2 | 1 | ... NO STOPPING AT THESE RATES ... |
| — | | — | |
| 12 | | 3 | ... THE HOME LOAN INTEREST RATE IS HIGH ... |
| — | | — | |
| 15 | | 6 | ... RATING HORSES IS EASY ... |
| — | | — | |
| 17 | | 8 | ...RATING COWS IS EASY ... |
| — | | — | |
| 20 | | 11 | ... INTEREST IN DEATH RATES FOR MICE IS LOW ... |
| — | | — | |
| 28 | | 19 | ... INTEREST IN DESKS IS HIGH ... |
| — | 3 | — | |
| 31 | | 2 | ... INTEREST HIM IN TEA ... |
| — | | — | |
| 40 | | 11 | ... INTERESTING THAT HE SLEEPS ... |
| — | | — | |
| 45 | | 16 | ... INTERESTING THAT YOU ASK ... |
| — | | — | |

TABLE 3-continued

EXAMPLE OF TEXTUAL DATA BASE

| (Textural Block Identifiers) Paragraph References | Document | Paragraph | |
|---|---|---|---|
| — | — | | |
| — | — | | |
| — | — | | |
| — | — | | |
| — | — | | |
| — | — | | |
| — | — | | |
| 58 | | 29 | ... INTERESTING HE WAS NOT HOME ... |

TABLE 4

EXAMPLE - TABLE OF PARAGRAPH REFERENCES
(PARAGRAPH IDENTIFIERS) IN DATA BASE

| EQUIVALENT ENTRY WORDS | PARAGRAPH REFERENCES (PARAGRAPH IDENTIFIERS) |
|---|---|
| . | |
| . | |
| INTEREST | 2,4,12,20,28,31 |
| INTERESTING | 6,40,45,58 |
| INTERET | 9 |
| . | |
| . | |
| RATE | 3,4,12 |
| RATES | 1,2,4,9,10,20 |
| RATING | 6,7,15,17 |
| . | |

TABLE 5

| PARAGRAPH REFERENCES (TEXTUAL BLOCK IDENTIFIER) | SCORE |
|---|---|
| 1 | 1 |
| 2 | 2 |
| 3 | 1 |
| 4 | 2 |
| 6 | 2 |
| 7 | 1 |
| 9 | 2 |
| 10 | 1 |
| 12 | 2 |
| 15 | 1 |
| 17 | 1 |
| 20 | 2 |
| 28 | 1 |
| 31 | 1 |
| 40 | 1 |
| 45 | 1 |
| 58 | 1 |

TABLE 6

| PARAGRAPH REFERENCES (TEXTUAL BLOCK IDENTIFIERS) | SCORE |
|---|---|
| 2 | 2 |
| 4 | 2 |
| 6 | 2 |
| 9 | 2 |
| 12 | 2 |
| 20 | 2 |
| 1 | 1 |
| 3 | 1 |
| 7 | 1 |

TABLE 6-continued

| PARAGRAPH REFERENCES (TEXTUAL BLOCK IDENTIFIERS) | SCORE |
|---|---|
| 10 | 1 |
| 15 | 1 |
| 17 | 1 |
| 28 | 1 |
| 31 | 1 |
| 40 | 1 |
| 45 | 1 |
| 58 | 1 |

What is claimed is

1. A method using digital data processing means and stored textual block identifiers in a table for locating in a stored data base having a plurality of textual blocks, those textual blocks having the best match with a query, the textual blocks in the data base having words grouped into such textual blocks, the textual block identifiers being grouped and each group of textual block identifiers corresponding to one of the blocks in the stored data base, each of the textual block identifiers providing an indication of one of the textual blocks in the stored data base which contains the word corresponding to the group of textual block identifiers in which the textual block identifier is located, the method comprising the steps of:

(a) receiving a query having representations of a plurality of query words to be located in the textual blocks contained in the stored data base;

(b) determining, for each one of a plurality of the query words, at least one corresponding set of equivalent words which are contained in the stored data base, each of the equivalent words in such set being equivalent to the corresponding query word and corresponding to one of the groups of textual block identifiers;

(c) processing the textual block identifiers contained in the groups of textual block identifiers which correspond to the words in the determined sets of equivalent words to thereby form a representation of a score for at least a first of the textual blocks which is represented by said textual block identifiers, the representation of a score representing the total number of said sets of equivalent words which have at least one of said equivalent words in said at least a first of the textual blocks; and (d) utilizing said representation of a score to provide output data pertaining to at least one textual block, for which a representation of a score has been formed.

2. A method according to claim 1 wherein the textual blocks comprise paragraphs and wherein the step of utilizing comprises the step of outputting the paragraphs as the textual blocks.

3. A method according to claim 1 wherein the step of processing comprises the step of reading out, from said textual block identifiers in a table, the texual block identifiers which correspond to each equivalent word which is determined in the step of determining.

4. A method according to claim 3 wherein the step of processing further comprises the step of performing at least one merge sort on representations of the textual block identifiers which are read out in the step of processing.

5. A method according to claim 1 wherein the step of processing comprises the steps of:

merging the textual block identifiers in the groups corresponding to the equivalent words in the sets of equivalent words into a further group of textual block identifiers, one of said further groups of textual block identifiers being formed for each set of equivalent words without duplicating therein any of the same textual block identifiers; and further processing each said further group of textual block identifiers to thereby form said representation of a score.

6. A method according to claim 5 wherein said step of further processing comprises the steps of:

merging the textual block identifiers taken from different ones of said further groups of textual block identifiers without duplicating therein any of the same textual block identifiers; and the means for step of processing comprises the step of forming a representation of a score for each of a plurality of the textual blocks, each said representation of a score indicating the number of further groups which contain at least one of the textual block identifiers corresponding to such textual block.

7. A method according to claim 1 wherein, in the step of processing, a different said representation of a score is provided for each of a plurality of the textual blocks, each representation of a score for each of the plurality of textual blocks providing an indication of the total number of sets of equivalent words which contain at least one of the equivalent words in the corresponding textual block.

8. A method according to claim 1 wherein, in the step of processing, one of said representations of a score is formed for each of a plurality of textual blocks; and wherein said step of utilizing said representation of a score to provide output data comprises the steps of selecting representations of textual blocks from the stored data base for output, which textual blocks are indicated by the textual block identifiers, and outputting the selected representations of the textual blocks ordered as a function of the corresponding representations of a score.

9. A method according to claim 8 wherein the representations of textual blocks are output in decreasing value order of the corresponding representations of a score.

10. A method according to claim 1 wherein the step of processing comprises the steps of:

forming a pointer set, each pointer set containing a representation of at least one pointer to one of said groups of textual block identifiers, utilizing the at least one representation of a pointer from one of said pointer sets to select a textual block identifier from said representation of a table.

11. A method according to claim 1 wherein the step of determining a corresponding set of equivalent words for a given one of the query words comprises the step of selecting words in the data base which are acceptable misspellings and acceptable inflections of the query word.

12. A method according to claim 11 wherein the step of selecting words which are acceptable misspellings and acceptable inflections comprises the step of selecting words which have an exact match, a character transposition, a single character deletion, or a single character insertion between a stem portion of a query word and the beginning characters of a data base word and which also have acceptable suffixes.

13. Digital data processing means using stored textual block identifiers in a table for locating in a stored data base having a plurality of textual blocks, those textual blocks having the best match with a query, the textual blocks in the data base having words grouped into such textual blocks, the textual block identifiers being grouped and each group of textual block identifiers corresponding to one of the words in the stored data base, each of the textual block identifiers providing an indication of one of the textual blocks in the stored data base which contains the word corresponding to the group of textual block identifiers in which the textual block identifier is located, the data processing means comprising:

(a) means for receiving a query having representations of a plurality of query words to be located in the textual blocks contained in the stored data base;

(b) means for determining, for each one of a plurality of the query words, at least one corresponding set of equivalent words which are contained in the stored data base, each of the equivalent words in such set being equivalent to the corresponding query word and corresponding to one of the groups of textual block identifiers;

(c) means for processing the textual block identifiers contained in the groups of textual block identifiers which correspond to the words in the determined sets of equivalent words to thereby form a representation of a score for at least a first of the textual blocks which is represented by said textual block identifiers, the representation of a score representing the total number of said sets of equivalent words which have at least one of said equivalent words in said at least a first of the textual blocks; and (d) means for utilizing said representation of a score to provide output data pertaining to at least one textual block, for which a representation of a score has been formed.

14. Means according to claim 13 wherein a textual block consists of a paragraph of the textual data base.

15. Means according to claim 13 wherein the means for processing comprises:
means for reading out, from said textual block identifiers in a table, the textual block identifiers which correspond to each equivalent word which is determined by the means for determining.

16. Means according to claim 15 wherein the means for processing further comprises means performing at lea one merge sort on representations of the textual block identifiers which are read out in forming the representation of a score.

17. Means according to claim 13 wherein the means for processing comprises:
means for merging the textual block identifiers in the groups corresponding to the equivalent words in the sets of equivalent words into a further group of textual block identifiers, one of said further groups of textual block identifiers being formed for each set of equivalent words without duplicating therein any of the same textual block identifiers; and
means for further processing each said further group of textual block identifers to thereby form said representation of a score.

18. Means according to claim 17 wherein said means for further processing comprises:
means for merging the textual block identifiers taken from different ones of said further groups of textual block identifiers without duplicating therein any of the same textual block identifiers; and
the means for processing comprises means for forming a representation of a score for each a plurality of the textual blocks, each said representation of a score indicating the number of further groups which contain at least one of the textual block identifiers corresponding to such textual block.

19. Means according to claim 13 wherein the means for processing comprises means for providing a different said representation of a score for each of a plurality of the textual blocks, each representation of a score for each of the plurality of textual blocks providing an indication of the total number of sets of equivalent words which contain at least one of the equivalent words in the corresponding textual block.

20. Means according to claim 13 wherein the means for processing comprises means for providing one of said representation of a score for each of a plurality of textual blocks; and
wherein said means for utilizing said representation of a score to provide output data comprises means for selecting representations of textual blocks from the stored data base for output, which textual blocks are indicated by the textual block identifiers, and means for outputting the selected representations of the textual blocks as a function of the corresponding representations of a score.

21. Means according to claim 20 wherein the means for outputting is operative for outputting representations of textual blocks in decreasing value order according to the representation of a score.

22. Means according to claim 13 wherein the means for processing comprises:
means for forming a pointer set, each pointer in the set containing a representation of at least one pointer to one of said groups of textual block identifiers, means for utilizing at least one representation of a pointer from one of said pointer sets to select a textual block identifier from said representation of a table.

23. Means according to claim 13 wherein the means for determining a corresponding set of equivalent words for a given one of the query words comprises means for selecting words in the data base which are acceptable misspellings and acceptable inflections of the query word.

24. Means according to claim 23 wherein the means for selecting words which are acceptable misspellings and acceptable inflections comprises means for selecting words which have an exact match, a character transposition, a character deletion or a character insertion between a stem portion of a query word and the beginning characters of a data base word.

25. Means according to claim 13 comprising at least one memory for storing and deriving therefrom said textual block identifiers in a table.

26. Means according to claim 20 comprising memory means for storing representations of the textual data base from which the representations of textual blocks are selected.

27. A method using digital data processing means and stored textual block identifiers in a table for locating in a stored data base having a plurality of textual blocks, those textual blocks having the best match with a query, the textual blocks in the data base having words grouped into such textual blocks, the textual block identifiers being grouped and each group of textual block identifiers corresponding to one of the words in the stored data base, each of the textual block identifiers providing an indication of one of the textual blocks in the stored data based which contains the word corresponding to the group of textual block identifiers in which the textual blocks comprising the steps of:

(a) receiving a query having a plurality of query words to be located in the textual blocks contained in the stored data base;

(b) determining, for each one of a plurality of the query words, at least one corresponding set of equivalent words which are contained in the stored data base, each of the equivalent words in each set being equivalent to the corresponding query word and corresponding to one of the groups of textual block identifiers;

(c) processing the textual block identifiers contained in the groups of textual block identifiers which correspond to the words in the determined sets of equivalent words to thereby form a representation of a score for at least a first of the textual blocks which is represented by said textual block identifiers, the representation of a score representing the total number of said sets of equivalent words which have at least one of said equivalent words in said at least a first of the textual blocks; and (d) utilizing said representation of a score to provide signals for locating at least one textual block in said stored data base.

28. Digital data processing means using stored textual block identifers in a table for locating in a stored data base of having a plurality of textual blocks those textual blocks having the best match with a query, the textual blocks in the data base having words grouped into such textual blocks, the textual block identifiers being grouped and each group of textual block identifiers corresponding to one of the words in the stored data base, each of the textual block identfiers providing an indication of one of the textual blocks in the stored data base which contains the word corresponding to the group of textual block identifiers in which the textual block identifier is located, the data processing means comprising:

(a) means for receiving a query having a plurality of query words to be located in the textual blocks contained in the stored data base;

(b) means for determining, for each one of a plurality of the query words, at least one corresponding set of equivalent words which are contained in the stored data base, each of the equivalent words in such set being equivalent to the corresponding query word and corresponding to one of the groups of textual block identifiers;

(c) means for processing the textual block identifiers contained in the groups of textual block identifiers which correspond to the words in the determined sets of equivalent words to thereby form a representation of a score for at least a first of the textual blocks which is represente by said textual block identifiers, the representation of a score representing the total number of said sets of equivalent words which have at least one of said equivalent words in said at least a first of the textual blocks; and (d) means for utilizing said representations of a score to provide signals for locating at least one textual block, for which a representation of a score has been formed, in said stored data base.

* * * * *